(12) United States Patent
Case et al.

(10) Patent No.: US 7,369,334 B2
(45) Date of Patent: May 6, 2008

(54) OPTICAL DEVICE WITH ALIGNMENT COMPENSATION

(75) Inventors: Steven K. Case, St. Louis Park, MN (US); Timothy A. Skunes, Mahtomedi, MN (US); Michael Knipfer, Maple Grove, MN (US); Gregory S. Mowry, Burnsville, MN (US)

(73) Assignee: Cyberoptics Corporation, Golden Valley, MN (US)

( * ) Notice: Subject to any disclaimer, the term of this patent is extended or adjusted under 35 U.S.C. 154(b) by 1 day.

(21) Appl. No.: 11/181,530

(22) Filed: Jul. 14, 2005

(65) Prior Publication Data

US 2005/0249464 A1 Nov. 10, 2005

Related U.S. Application Data

(60) Division of application No. 10/420,349, filed on Apr. 22, 2003, now abandoned, and a continuation-in-part of application No. 10/352,798, filed on Jan. 28, 2003, now Pat. No. 7,010,855, which is a division of application No. 09/789,125, filed on Feb. 20, 2001, now Pat. No. 6,546,173, application No. 11/181,530, which is a continuation-in-part of application No. 10/352,795, filed on Jan. 28, 2003, now Pat. No. 6,971,164, which is a division of application No. 09/789,124, filed on Feb. 20, 2001, now Pat. No. 6,546,172, application No. 11/181,530, which is a continuation-in-part of application No. 09/789,317, filed on Feb. 20, 2001, now Pat. No. 6,590,658.

(60) Provisional application No. 60/404,894, filed on Aug. 20, 2002, provisional application No. 60/402,135, filed on Aug. 9, 2002, provisional application No. 60/402,134, filed on Aug. 9, 2002, provisional application No. 60/375,052, filed on Apr. 22, 2002.

(51) Int. Cl.
*G02B 7/02* (2006.01)

(52) U.S. Cl. .................. 359/822; 359/744; 359/819

(58) Field of Classification Search ............... 359/822, 359/744

See application file for complete search history.

(56) References Cited

U.S. PATENT DOCUMENTS 3,407,018 A 10/1968 Miller .................. 350/321

(Continued)

FOREIGN PATENT DOCUMENTS

DE 23 58 785 6/1975

(Continued)

OTHER PUBLICATIONS

"Micro-Mechanical Alignment Structures (patent pending)", from Web Site of Axsun Technologies, 2 pages, downloaded Feb. 15, 2001.

(Continued)

*Primary Examiner*—Jessica T Stultz
(74) *Attorney, Agent, or Firm*—Westman, Champlin & Kelly, P.A.

(57) ABSTRACT

An optical device is provided which includes a plurality of optical modules and an alignment compensation module. Each optical module includes an optical component fixedly coupled to a relative reference mount. The relative reference mount is configured to attach to a substrate. A plurality of optical modules mount on the substrate to form the optical device. The alignment compensation module removes residual alignment errors of the optical device.

8 Claims, 31 Drawing Sheets

U.S. PATENT DOCUMENTS

| | | | |
|---|---|---|---|
| 3,800,388 A | 4/1974 | Borner et al. ................. 29/200 |
| 4,180,307 A | 12/1979 | Tateoka et al. ............. 350/6.5 |
| 4,250,520 A | 2/1981 | Denlinger ................... 357/68 |
| 4,457,467 A | 7/1984 | Klement et al. ............ 228/103 |
| 4,475,788 A * | 10/1984 | Tomassini et al. ............ 385/33 |
| 4,569,591 A * | 2/1986 | Ford et al. .................. 356/153 |
| 4,708,429 A | 11/1987 | Clark et al. ................ 350/96.2 |
| 4,720,163 A | 1/1988 | Goodwin et al. .......... 350/96.2 |
| 4,730,198 A | 3/1988 | Brown et al. ............. 350/96.2 |
| 4,737,845 A | 4/1988 | Susuki et al. ............... 358/101 |
| 4,745,681 A | 5/1988 | Hollis, Jr. et al. ............ 29/837 |
| 4,750,799 A | 6/1988 | Kawachi et al. ......... 350/96.11 |
| 4,752,109 A | 6/1988 | Gordon et al. ............ 350/96.2 |
| 4,752,816 A | 6/1988 | Sussman et al. ............. 357/30 |
| 4,790,618 A | 12/1988 | Abe ........................ 350/96.15 |
| 4,798,439 A | 1/1989 | Preston ..................... 350/96.2 |
| 4,807,956 A | 2/1989 | Tournereau et al. ....... 350/96.2 |
| 4,817,849 A | 4/1989 | Yamamoto et al. ......... 228/103 |
| 4,845,052 A | 7/1989 | Abend ........................ 437/209 |
| 4,854,667 A | 8/1989 | Ebata et al. ............... 350/96.2 |
| 4,892,377 A | 1/1990 | Randle ...................... 350/96.2 |
| 4,909,590 A | 3/1990 | Kamiko et al. ........... 350/96.22 |
| 4,954,458 A | 9/1990 | Reid ............................ 437/51 |
| 4,979,970 A | 12/1990 | Dannoux et al. ................. 65/2 |
| 4,989,934 A | 2/1991 | Zavracky et al. ........ 350/96.11 |
| 5,023,881 A | 6/1991 | Ackerman et al. ............ 372/46 |
| 5,093,879 A | 3/1992 | Bregman et al. .............. 385/79 |
| 5,093,984 A | 3/1992 | Lape ............................ 29/741 |
| 5,113,404 A | 5/1992 | Gaebe et al. .................. 372/36 |
| 5,123,074 A | 6/1992 | Yokota et al. ................. 385/95 |
| 5,170,455 A | 12/1992 | Gooseen et al. .............. 385/89 |
| 5,177,807 A | 1/1993 | Avelange et al. ............. 385/91 |
| 5,195,707 A | 3/1993 | Ignatuk et al. ............... 248/179 |
| 5,210,811 A | 5/1993 | Avelange et al. ............. 385/91 |
| 5,215,489 A | 6/1993 | Nakamura ..................... 445/4 |
| 5,216,729 A | 6/1993 | Berger et al. ................. 385/31 |
| 5,235,407 A | 8/1993 | Spigarelli et al. ............ 356/399 |
| 5,247,597 A | 9/1993 | Blacha et al. ................. 385/88 |
| 5,249,733 A | 10/1993 | Brady et al. ........... 228/180.22 |
| 5,251,266 A | 10/1993 | Spigarelli et al. ............... 382/8 |
| 5,283,446 A | 2/1994 | Tanisawa .................... 357/433 |
| 5,296,072 A | 3/1994 | Dannoux et al. ............ 156/257 |
| 5,322,463 A | 6/1994 | Young ............................ 445/4 |
| 5,351,330 A | 9/1994 | Jongewaard ................. 385/93 |
| 5,371,822 A | 12/1994 | Horwitz et al. ............... 385/89 |
| 5,383,118 A | 1/1995 | Nguyen ................. 364/167.01 |
| 5,416,872 A | 5/1995 | Sizer, II et al. ............... 385/92 |
| 5,435,734 A | 7/1995 | Chow ........................... 439/69 |
| 5,450,508 A | 9/1995 | Decusatis et al. .............. 385/25 |
| 5,471,306 A | 11/1995 | Yui et al. ..................... 356/367 |
| 5,471,310 A | 11/1995 | Spigarelli et al. ............ 356/399 |
| 5,475,775 A | 12/1995 | Kragl et al. ................... 438/25 |
| 5,478,778 A | 12/1995 | Tanisawa .................... 437/183 |
| 5,499,312 A | 3/1996 | Hahn et al. .................... 385/91 |
| 5,535,296 A | 7/1996 | Uchida ........................ 385/89 |
| 5,550,088 A | 8/1996 | Dautartas et al. ............ 437/225 |
| 5,555,333 A | 9/1996 | Kato ............................ 385/89 |
| 5,559,914 A | 9/1996 | Asakura ....................... 385/49 |
| 5,568,892 A | 10/1996 | Basavanhally ......... 228/180.22 |
| 5,570,184 A | 10/1996 | Armington et al. ......... 356/375 |
| 5,574,561 A | 11/1996 | Boudreau et al. .......... 356/399 |
| 5,603,870 A | 2/1997 | Roll et al. ................. 264/1.25 |
| 5,621,829 A | 4/1997 | Ford ............................ 385/22 |
| 5,625,733 A | 4/1997 | Frigo et al. .................. 385/88 |
| 5,644,668 A | 7/1997 | Chambers et al. ............ 385/90 |
| 5,647,044 A | 7/1997 | Basavanhally et al. ....... 385/92 |
| 5,659,641 A | 8/1997 | DeMeritt et al. .............. 385/14 |
| 5,671,315 A | 9/1997 | Tabuchi et al. ............. 385/137 |
| 5,677,973 A | 10/1997 | Yuhara et al. ................. 385/90 |
| 5,687,267 A | 11/1997 | Uchida ........................ 385/89 |
| 5,694,678 A | 12/1997 | Karasik ........................ 29/721 |
| 5,700,987 A | 12/1997 | Basavanhally ............. 219/56.1 |
| 5,721,797 A | 2/1998 | Basavanhally et al. ........ 385/49 |
| 5,737,467 A | 4/1998 | Kato et al. .................... 385/92 |
| 5,745,624 A | 4/1998 | Chan et al. .................... 385/91 |
| 5,748,822 A | 5/1998 | Miura et al. .................. 385/90 |
| 5,748,827 A | 5/1998 | Holl et al. ................... 385/134 |
| 5,778,120 A | 7/1998 | Asakura et al. ............... 385/49 |
| 5,833,202 A | 11/1998 | Wolfgang ................... 248/466 |
| 5,854,867 A | 12/1998 | Lee et al. ...................... 385/49 |
| 5,859,943 A | 1/1999 | Asakura et al. ............... 385/49 |
| 5,872,880 A | 2/1999 | Maynard ...................... 385/88 |
| 5,883,988 A | 3/1999 | Yamamoto et al. ........... 385/14 |
| 5,892,179 A | 4/1999 | Rinne et al. .................. 174/261 |
| 5,894,657 A | 4/1999 | Kanayama et al. ........... 29/740 |
| 5,898,806 A | 4/1999 | Nishimoto .................... 385/49 |
| 5,906,753 A | 5/1999 | Aoyagi et al. ................ 216/24 |
| 5,907,649 A | 5/1999 | Acklin et al. ................. 385/49 |
| 5,916,458 A | 6/1999 | Komoriya et al. ...... 219/121.63 |
| 5,937,123 A | 8/1999 | Frelier ......................... 385/79 |
| 5,966,486 A | 10/1999 | Boudreau et al. ............. 385/90 |
| 5,970,200 A | 10/1999 | Takikawa et al. ........... 385/137 |
| 5,977,567 A | 11/1999 | Verdiell ....................... 257/99 |
| 5,985,086 A | 11/1999 | Peall .......................... 156/292 |
| 6,010,251 A | 1/2000 | Koyanagi et al. ............. 385/93 |
| 6,027,253 A | 2/2000 | Ota et al. ..................... 385/83 |
| 6,027,254 A | 2/2000 | Yamada et al. ............... 385/88 |
| 6,058,234 A | 5/2000 | Tachigori ...................... 385/49 |
| 6,074,103 A | 6/2000 | Hargreaves et al. .......... 385/90 |
| 6,106,161 A | 8/2000 | Basavanhally et al. ....... 385/88 |
| 6,112,001 A | 8/2000 | Kishida et al. ............... 385/49 |
| 6,115,515 A | 9/2000 | Itoh et al. .................... 385/14 |
| 6,118,917 A | 9/2000 | Lee et al. ..................... 385/49 |
| 6,130,448 A | 10/2000 | Bauer et al. ................ 257/222 |
| 6,132,106 A | 10/2000 | Yokoyama .................... 385/74 |
| 6,148,511 A | 11/2000 | Taguchi ....................... 29/834 |
| 6,151,173 A | 11/2000 | Massit et al. ................ 359/811 |
| 6,157,050 A | 12/2000 | Fukuoka ...................... 257/82 |
| 6,160,936 A | 12/2000 | You et al. .................... 385/49 |
| 6,164,837 A | 12/2000 | Haake et al. .................. 385/90 |
| 6,186,674 B1 | 2/2001 | Basavanhally ............... 385/88 |
| 6,222,579 B1 | 4/2001 | Sousa ......................... 347/241 |
| 6,253,005 B1 | 6/2001 | Bergmann et al. ............. 385/33 |
| 6,318,906 B1 | 11/2001 | Ishizaka ....................... 385/88 |
| 6,320,705 B1 | 11/2001 | Dube' ........................ 359/796 |
| 6,327,407 B1 | 12/2001 | Mitsuda et al. ................ 385/49 |
| 6,374,012 B1 | 4/2002 | Bergmann et al. ............. 385/33 |
| 6,392,778 B1 | 5/2002 | Perduijn et al. ............. 359/245 |
| 6,396,854 B1 | 5/2002 | Takagi ......................... 372/20 |
| 6,430,337 B1 | 8/2002 | Bergmann et al. ............. 385/25 |
| 6,467,972 B2 | 10/2002 | Setoguchi ..................... 385/88 |
| 6,470,120 B2 | 10/2002 | Green et al. ................... 385/52 |
| 6,546,172 B2 | 4/2003 | Case et al. .................... 385/52 |
| 6,546,173 B2 | 4/2003 | Case et al. .................... 385/52 |
| 6,547,454 B2 | 4/2003 | Wilkman et al. .............. 385/88 |
| 6,597,829 B2 * | 7/2003 | Cormack ...................... 385/22 |
| 6,606,785 B1 | 8/2003 | Kadohata et al. ............. 29/740 |
| 6,654,524 B2 | 11/2003 | Shekel et al. .................. 385/52 |
| 6,709,169 B2 | 3/2004 | Rossi ........................... 385/92 |
| 6,717,745 B2 * | 4/2004 | Nemes ....................... 359/710 |
| 6,952,513 B2 | 10/2005 | Murphy et al. ................ 385/52 |
| 2001/0010743 A1 | 8/2001 | Cayrefoureq et al. ......... 385/88 |
| 2002/0037141 A1 | 3/2002 | Miyamoto et al. |
| 2002/0037142 A1 | 3/2002 | Rossi ........................... 385/92 |

FOREIGN PATENT DOCUMENTS

| | | |
|---|---|---|
| DE | 196 44 758 A1 | 4/1998 |
| EP | 0 325 431 | 7/1989 |
| EP | 0544024 A1 | 6/1993 |
| EP | 0 600 645 A1 | 6/1994 |
| EP | 0 821 218 A2 | 1/1998 |
| EP | 0 840 154 A1 | 5/1998 |
| EP | 0 903 600 A1 | 3/1999 |

| | | |
|---|---|---|
| EP | 0 903 608 A2 | 3/1999 |
| EP | 0907092 A1 | 4/1999 |
| EP | 0 921 702 A2 | 6/1999 |
| EP | 0 977 061 A2 | 2/2000 |
| EP | 1 008 877 A2 | 6/2000 |
| EP | 1 014 125 A2 | 6/2000 |
| FR | 2 779 536 | 12/1999 |
| JP | 54-12286 | 1/1979 |
| JP | 62-276890 | 12/1987 |
| JP | 63-12187 | 1/1988 |
| JP | 63-65411 | 3/1988 |
| JP | 63-193113 | 8/1988 |
| JP | 63-228113 | 9/1988 |
| JP | 1-302214 | 12/1989 |
| JP | 6-34852 | 2/1994 |
| JP | 6-174943 | 6/1994 |
| JP | 6-201921 | 7/1994 |
| JP | 6-331840 | 12/1994 |
| JP | 7-333472 | 12/1995 |
| JP | 61-277908 | 12/1996 |

OTHER PUBLICATIONS

"An Innovative Flexible and Accurate Packaging Technique Suited to Fabricate Low Cost Micro Optoelectronic Modules", by M. Scussat et al., *Electronic Components and Technology Conference*, 2000, pp. 26-32.

Article from Web Site entitled "The Photonics Program and the Engineering Research Division at LLNL are Automating the Packaging of Optoelectronic Devices to Lower Costs", 3 pages, downloaded Oct. 19, 2000.

Article from Web Site entitled "Automated Optoelectronic Packaging", 2 pages, downloaded Feb. 5, 2001.

Article from Web Site entitled Micro Assembly Automation, 3 pages., downloaded Feb. 5, 2001.

"Notification of Transmittal of the International Search Report or Declaration" PCT/US02/05412.

"Notification of Transmittal of the International Search Report or Declaration" PCT/US02/05268.

"Notification of Transmittal of the International Search Report or Declaration" PCT/US02/05497.

"Notification of Transmittal of the International Search Report or Declaration" PCT/US02/05498.

"3.5 Gb/s x 4 ch Optical Interconnection Module for ATM Switching System" by N. Tanaka et al., *Electronic Components and Technology Conference*, pp. 210-216, 1997.

"Advanced Flip Chip Bonding Techniques Using Transferred Microsolder Bumps", by N. Koshoubu et al., *Electronic Components and Technology Conference*, pp. 272-277, 1999.

"Hybrid Integrated 4–4 Optical Matrix Switch Using Self-Aligned Semiconductor Optical Amplifier Gate Arrays and Silica Planar Lightwave Circuit", *Electronics Letters*, vol. 34, No. 10, pp. 986-987, May 14, 1998.

"Risley Prism Pair Switching Enables Parallel Testing", by B. Holtkamp et al, *WDM Solutions*, 3 pages, Mar. 2002.

"Design and Manufacturability Issues of a Co-package DFB/MZ Module", by K. Anderson, *IEEE Electronic Components and Technology Conference*, 4 pgs., 1999.

2 pages from website www.ofr.com/Fiber/Tweakers_FO-12.htm, enttiled "Alignment Tools".

Copy European Search Report.

"Novel Fiber Alignment Method Using a Partially Metal-Coated Fiber in s Silicon V-Groove", by S. Kaneko et al., *IEEE Photonics Technology Letters*, vol. 12, No. 6, Jun. 2000, pp. 645-647.

"Notification of Transmittal of the International Search Report or the Declaration" PCT/US03/26006.

"Written Opinion" from PCT/US03/26006.

"Written Opinion" for PCT/US03/12252.

\* cited by examiner

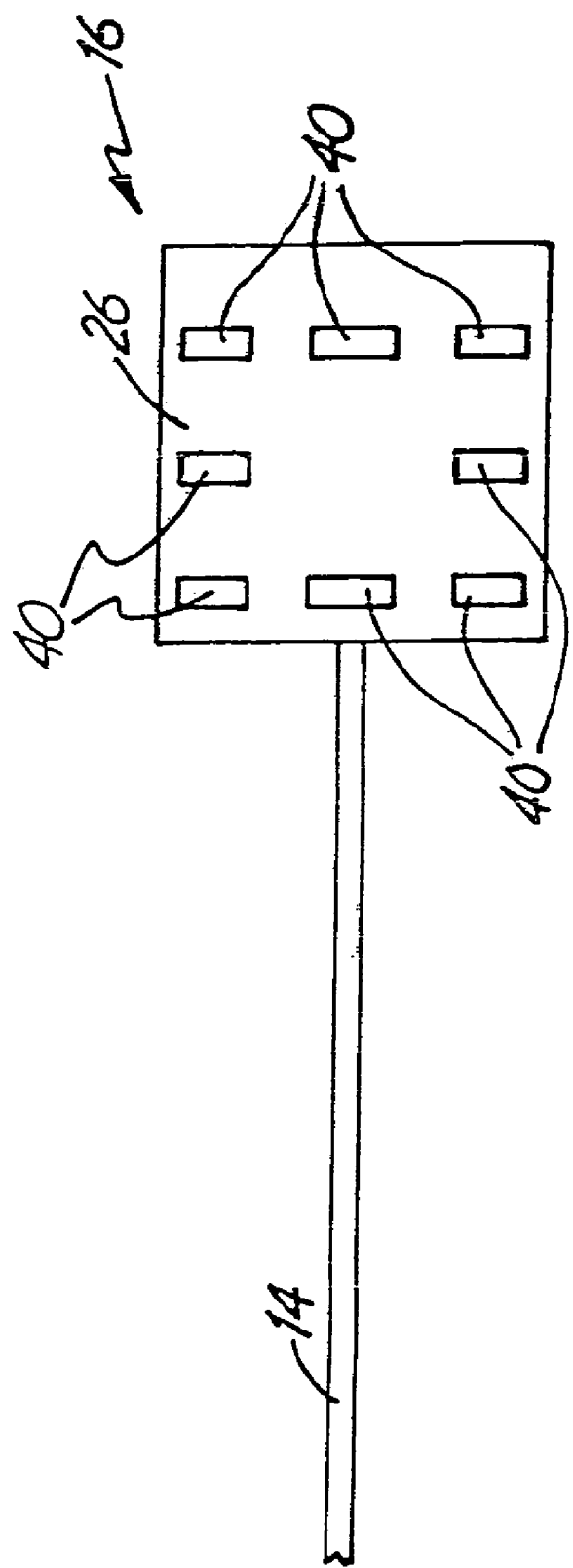

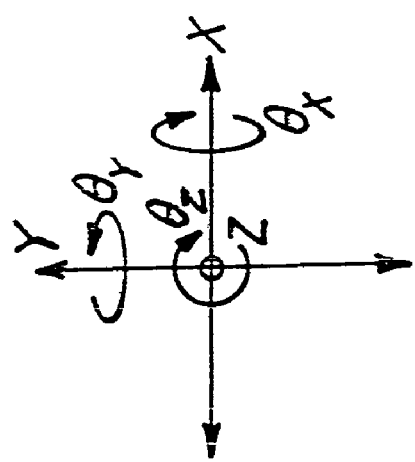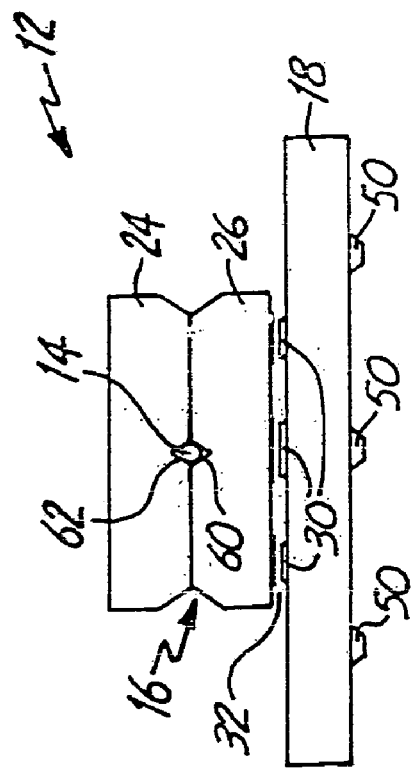
FIG. 3

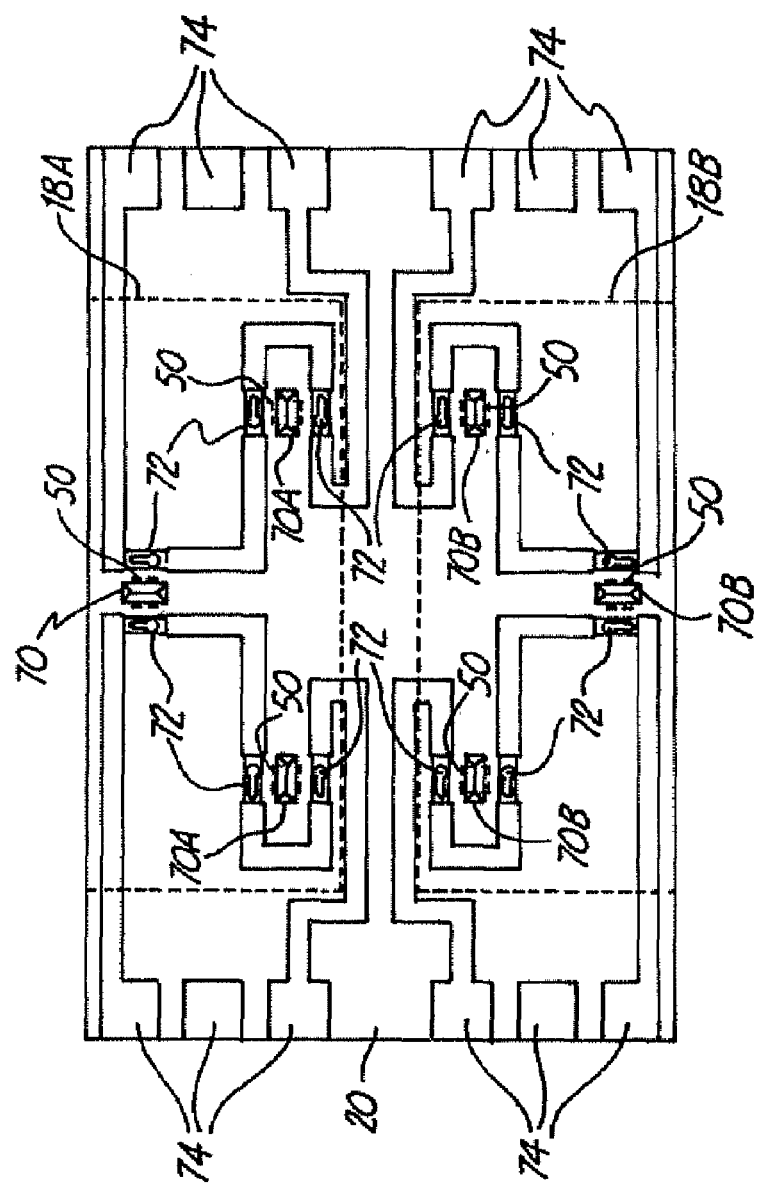

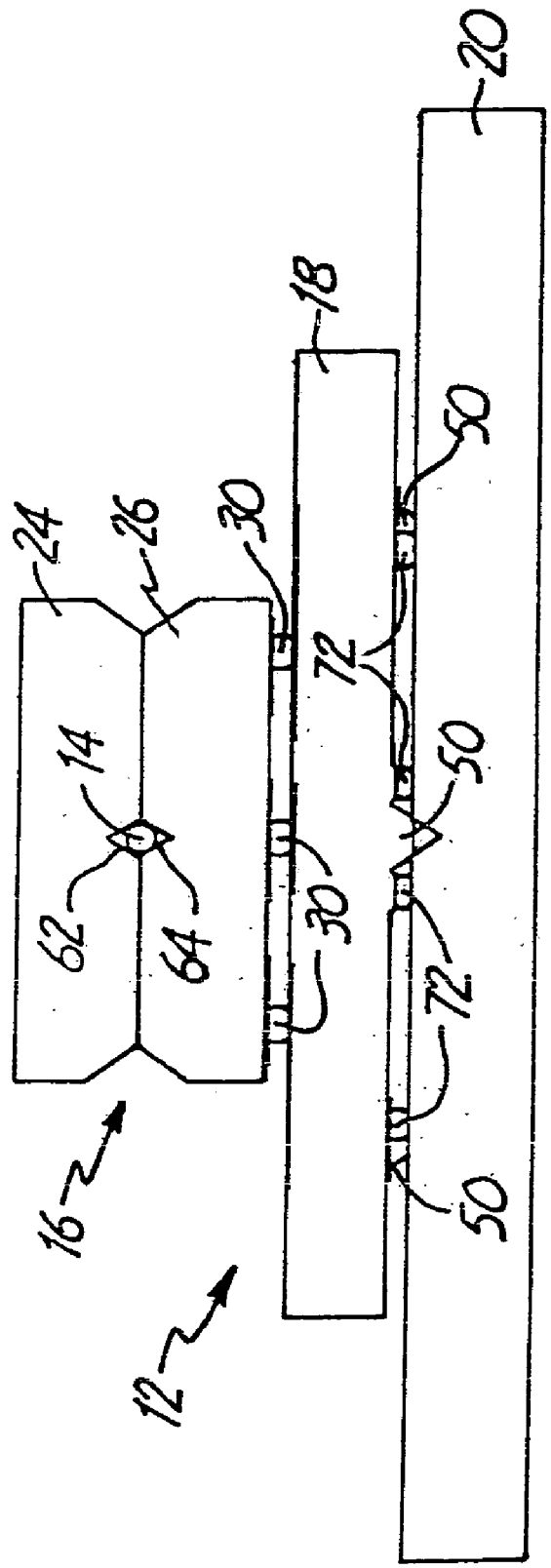

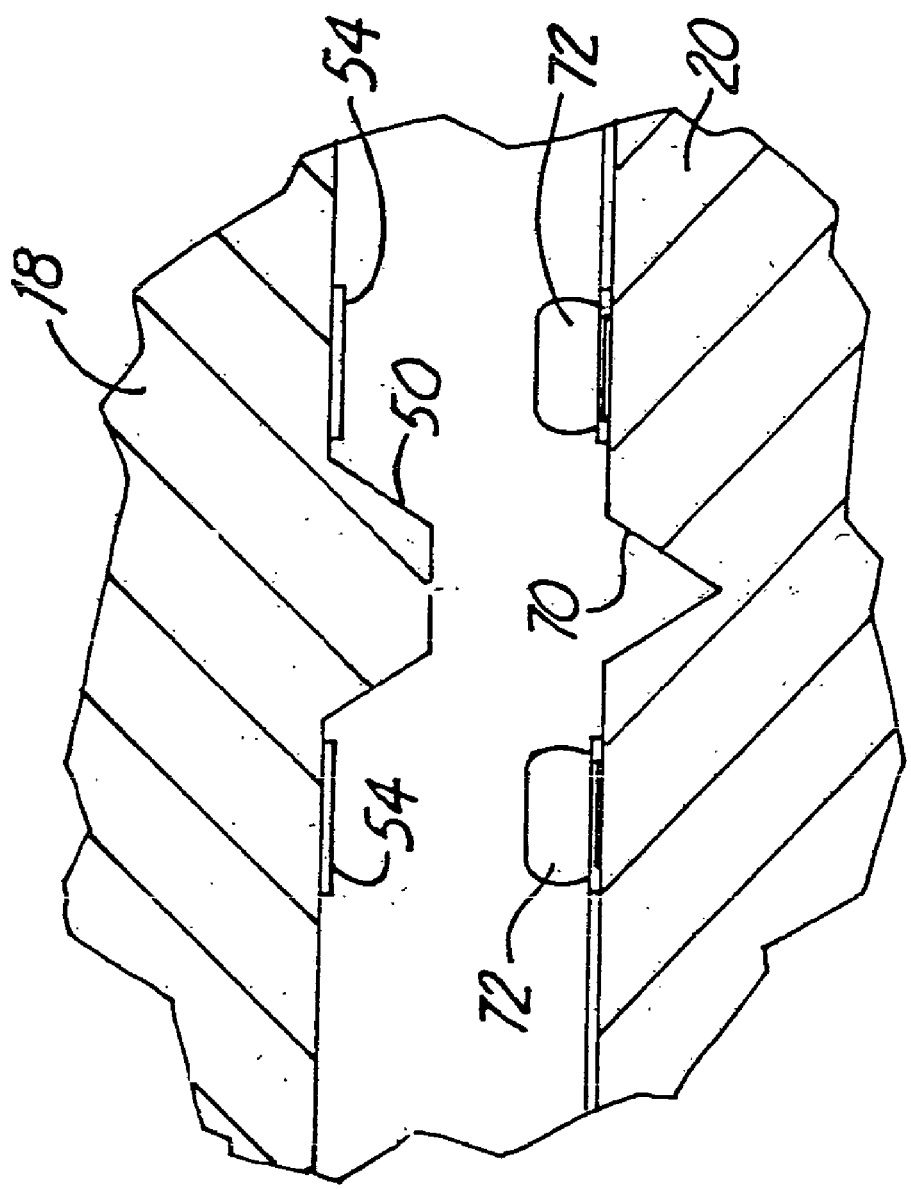

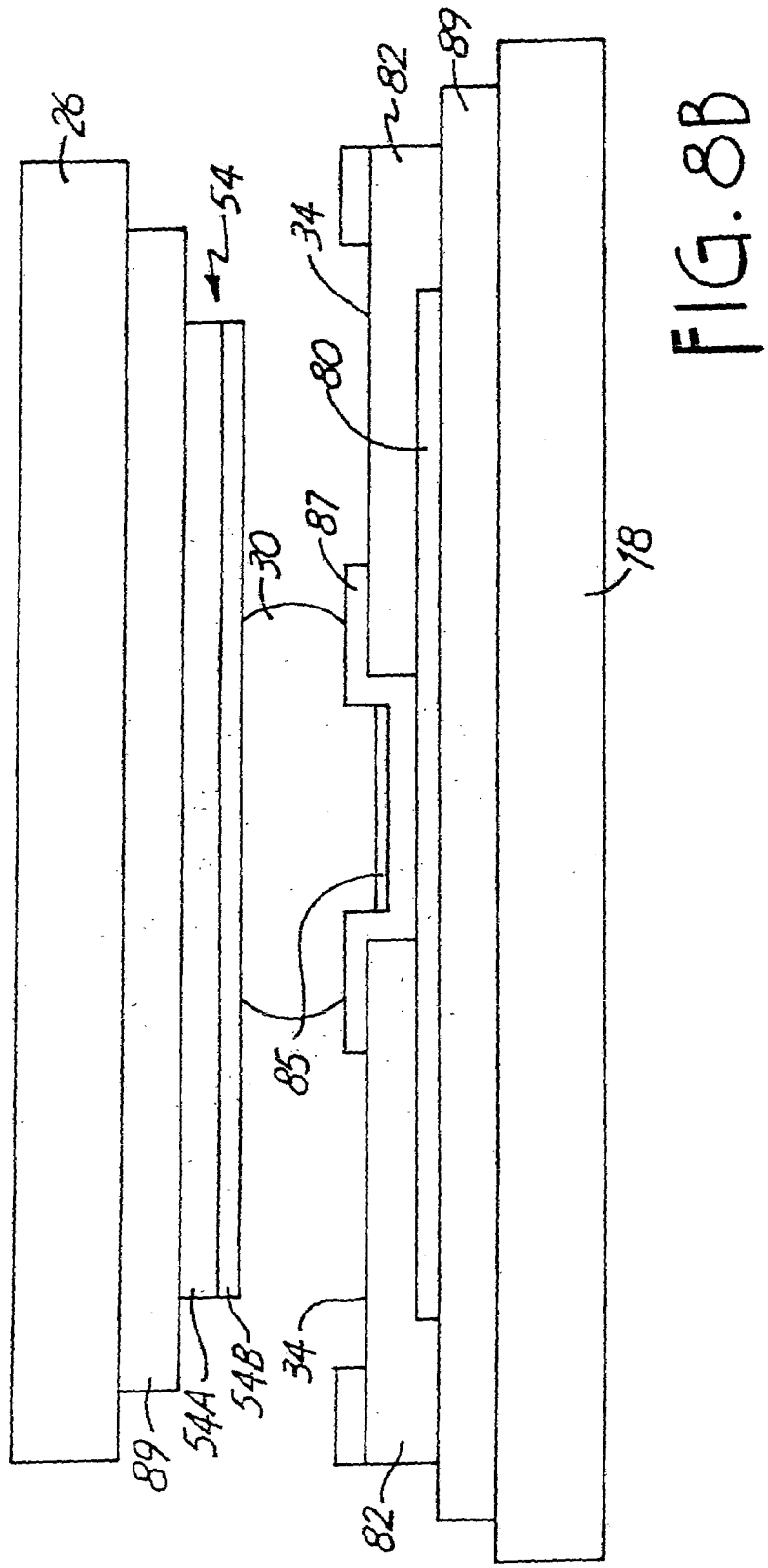

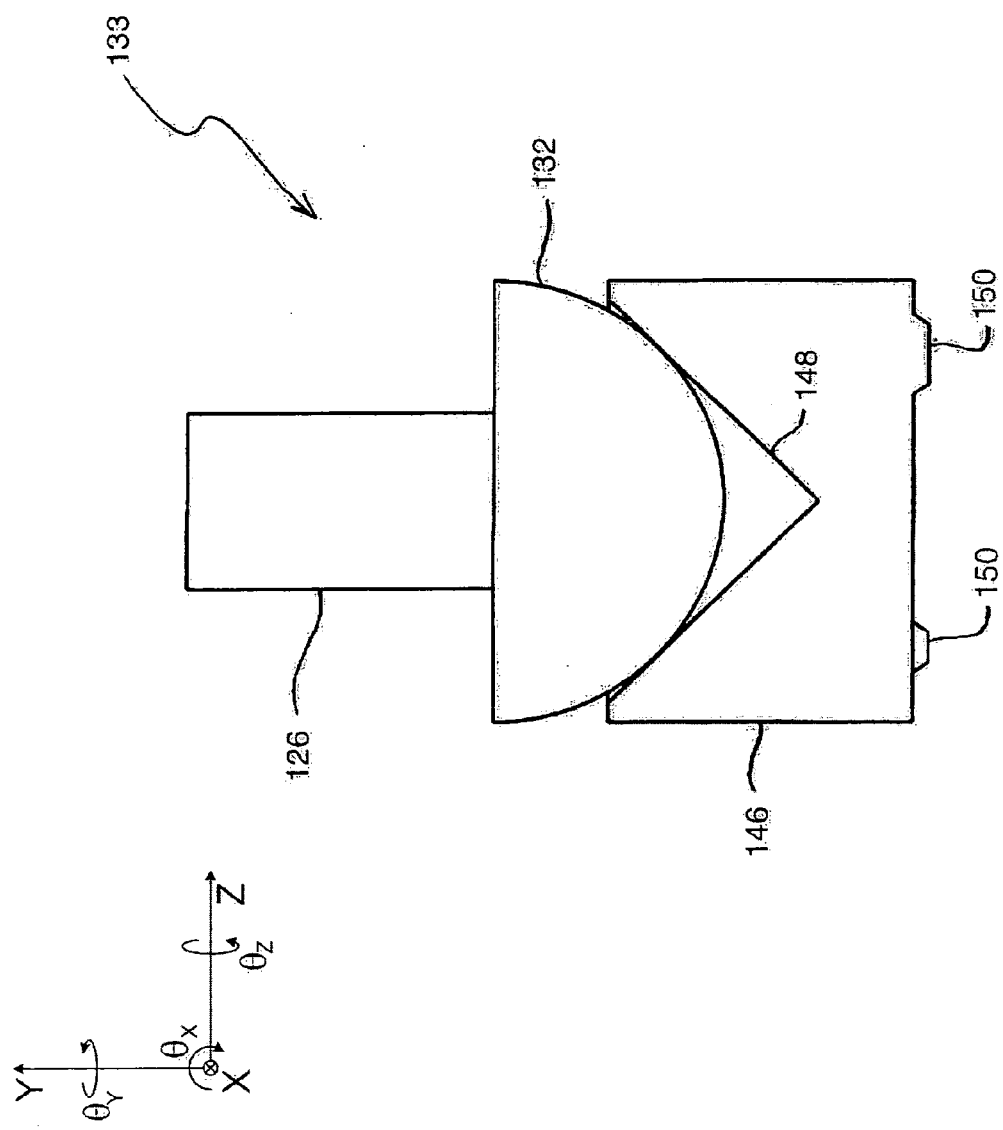
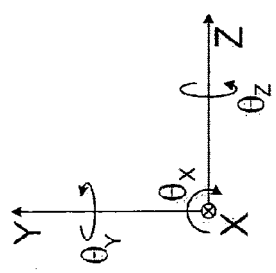
FIG. 15

OPTICAL DEVICE WITH ALIGNMENT COMPENSATION

The present application is a Divisional of application Ser. No. 10/420,349, filed Apr. 22, 2003 now abandoned which is based on and claims the benefit of U.S. provisional patent application Ser. No. 60/375,052, filed Apr. 22, 2002, Ser. No. 60/402,135, filed Aug. 9, 2002, Ser. No. 60/402,134, filed Aug. 9, 2002, Ser. No. 60/404,894, filed Aug. 20, 2002, the contents of which are hereby incorporated by reference in their entirety; also, the present application is a Continuation-In-Part of and claims priority of U.S. patent application Ser. No. 10/352,798, filed Jan. 28, 2003 now U.S. Pat. No. 7,010,855, entitled OPTICAL MODULE, which is a Divisional of Ser. No. 09/789,125, filed Feb. 20, 2001, now U.S. Pat. No. 6,546,173, issued Apr. 8, 2003; the present application is also a Continuation-In-Part of U.S. patent application Ser. No. 10/352,795, filed Jan. 28, 2003 now U.S. Pat. No. 6,971,164, entitled, OPTICAL DEVICE, which is a Divisional of U.S. Pat. No. 09/789,124 filed Feb. 20, 2001, now U.S. Pat. No. 6,546,172, issued Apr. 8, 2003; this application is also a Continuation-In-Part of U.S. patent application Ser. No. 09/789,317, filed Feb. 20, 2001 now U.S. Pat. No. 6,590,658, entitled OPTICAL ALIGNMENT SYSTEM, the contents of which are hereby incorporated by reference in their entirety.

BACKGROUND OF THE INVENTION

The present invention relates to optical components and optical devices fabricated from such components. More specifically, the present invention relates to alignment compensation of such devices.

Optical devices are being increasingly used in various industries and technologies in order to provide high speed data transfer such as a fiber optic communication equipment. In many applications there is a transition or an incorporation of optical devices where previously only electrical devices were employed. An optical device typically consists of a number of components which must be precisely assembled and aligned for the device to operate and function efficiently. Example components include fibers, waveguides, lasers, modulators, detectors, gratings, optical amplifiers, lenses, mirrors, prisms, windows, etc.

Historically, optical devices such as those used in fiber optic telecommunications, data storage and retrieval, optical inspection, etc. have had little commonality in packaging and assembly methods. This limits the applicability of automation equipment for automating the manufacture of these devices since there is such a disparity in the device designs. To affect high volume automated manufacturing of such devices, parts of each individual manufacturing line have to be custom-designed.

In contrast, industries such as printed circuit board manufacturing and semiconductor manufacturing have both evolved to have common design rules and packaging methods. This allows the same piece of automation equipment to be applied to a multitude of designs. Using printed circuits as an example, diverse applications ranging from computer motherboards to cellular telephones may be designed from relatively the same set of fundamental building blocks. These building blocks include printed circuit boards, integrated circuit chips, discrete capacitors, and so forth. Furthermore, the same automation equipment, such as a pick and place machine, is adaptable to the assembly of each of these designs because they use common components and design rules.

Further complications arise in automated assembly of optical devices. Such assembly is complicated because of the precise mechanical alignment requirements of optical components. This adds to problems which arise due to design variations. The problem arises from the fact that many characteristics of optical components cannot be economically controlled to exacting tolerances. Examples of these properties include the fiber core concentricity with respect to the cladding, the location of the optical axis of a lens with respect to its outside mechanical dimensions, the back focal position of a lens, the spectral characteristics of a thin-film interference filter, etc. Even if the mechanical mounting of each optical element were such that each element was located in its exact theoretical design position, due to the tolerances listed above, the performance specifications of the optical device may not be met.

To appreciate the exacting alignment requirements of high performance optical devices, consider the simple example of aligning two single mode optical fibers. In this example, the following mechanical alignments are required to ensure adequate light coupling from one fiber to the other: the angle of the fibers with respect to each other, the fiber face angle, the transverse alignment (perpendicular to the light propagation direction) and the longitudinal spacing (parallel to the light propagation direction).

Typical single mode optical fibers used in telecommunications for the 1.3 µm to 1.6 µm wavelength range have an effective core diameter of about 9 microns and an outside cladding dimension of 125 microns. The typical tolerance for the concentricity of the core to the outside diameter of the cladding is 1 micron. If the outside claddings of the two fibers were perfectly aligned and there is no angular misalignment or longitudinal spacing, the cores may still be transversely misaligned by as much as 2 microns. This misalignment would give a theoretical coupling loss of about 14 percent or 0.65 dB. This loss is unacceptable in many applications. It would be desirable to provide an optical device which addresses some of the deficiencies of the prior art.

SUMMARY OF THE INVENTION

In one example aspect, an optical device is provided which comprises a plurality of optical modules and an alignment compensation module. Each optical module includes an optical component to operably couple to a relative reference mount. The relative reference is configured to couple to a fixed reference mount. A plurality of optical modules mounted on the fixed reference mount form the optical device. The alignment compensation module removes residual alignment errors of the optical device.

BRIEF DESCRIPTION OF THE DRAWINGS

FIG. 2B is a bottom plan view of a component mount.

FIG. 3 is a front plan view of an optical module of FIG. 1.

FIG. 5 is a top plan view of a fixed reference mount shown in FIG. 1.

FIG. 6 is a cross-sectional view of the optical module of FIG. 4 taken along the line labeled 6-6.

FIG. 7B is an exploded cross-sectional view of the registration features.

FIG. 8B is a side cross-sectional view showing the bonding material of FIG. 8A.

FIG. 15 is a side sectional view of an optical filter module.

DETAILED DESCRIPTION OF THE PREFERRED EMBODIMENTS

The present invention includes various aspects that reduce or eliminate many of the problems associated with the prior art. The present invention offers an optical device fabricated from optical modules which are prealigned in standardized optical modules. Each optical module can be aligned with sub-micron precision with respect to registration features. Registration features on a module can be aligned with matching features on a substrate. This is similar to mounting an electrical component in or on a printed circuit board. Optical devices can be easily fabricated by mounting pre-aligned optical modules in the optical "circuit board" and using alignment compensation modules. The prealignment of the optical module can compensate for variations between components to substantially reduce component variability. The use of alignment compensation modules greatly relaxes optical module and substrate tolerances at the small additional complexity of performing a final alignment with an alignment compensation module. The prealigned optical modules are well suited for automated fabrication of devices. The modules can be fabricated in silicon using techniques which are well known in the art of silicon processing. However, any appropriate material can be used. Preferable materials are those which are used with existing electrical or optical components. Further, the invention can be used with active devices such as lasers, modulators, detectors, etc. Electrical conductors can be fabricated on the various layers for coupling to active optical components. Electrical circuitry including analog and digital circuitry can also be fabricated directly on the modules or on the fixed reference mount.

In one aspect, the present invention provides an optical device formed from at least two optical modules in which optical components are mounted to optical component mounts. The optical component mount is fixed to a relative reference mount such as a base mounting plate at a desired position and orientation. The relative reference mount is coupled to a fixed reference mount such as a substrate such that the optical component is maintained at a desired position and orientation relative to the fixed reference mount. In this general configuration, the optical component can be pre-aligned to a desired spacial reference and orientation by adjusting the optical component mount relative to the reference mount prior to fixing their relative positions. This can be used to provide general component pre-alignment as well as compensate for the variations which can arise between optical components. The following description sets forth a number of specific examples, however, in various aspects, the present invention is not limited to the specific configurations, components or techniques set forth herein.

Figure 1:
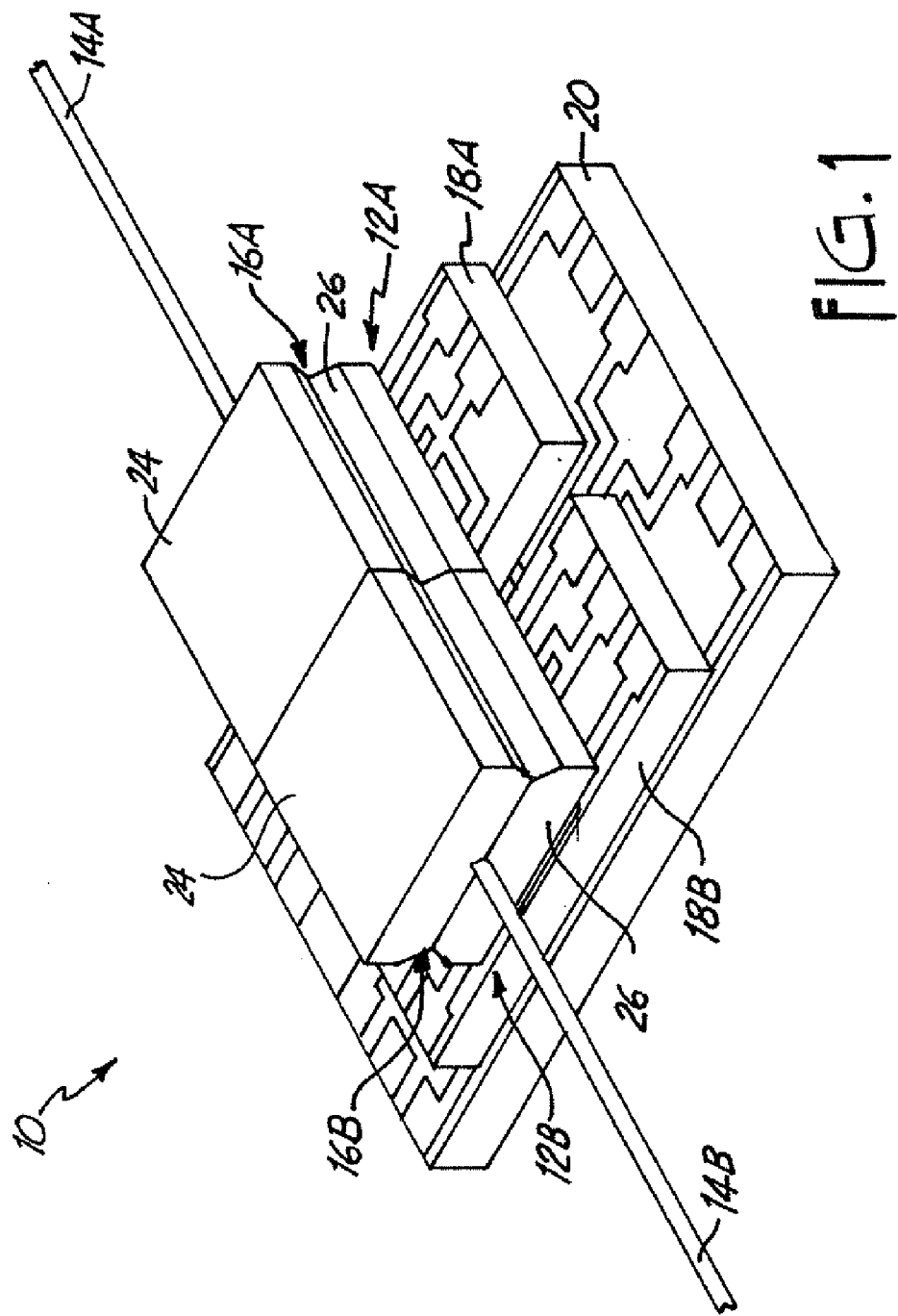
FIG. 1 is a perspective view of an optical device in accordance with one example embodiment of the present invention.

FIG. 1 is a perspective view of an optical device 10. Optical device 10 is shown as a simple optical fiber to optical fiber coupler for purposes of illustrating the present invention. However, the invention is applicable to more complex or other optical devices and other types of optical components.

In FIG. 1, the optical device 10 is fabricated from two optical modules 12A and 12B which include respective optical components 14A and 14B illustrated in this specific example as optical fibers. The fibers are mounted to respective optical component mounts 16A and 16B which are positioned and oriented to achieve a desired position and orientation of optical components 14A and 14B relative to base mounting plates 18A and 18B, respectively. A number of specific examples of this coupling are set forth below in more detail, however, other aspects of the invention are not limited to such examples. In the example illustrations specifically set forth in FIG. 1, base mounting plates 18A and 18B comprise substantially planar mating plates. Base mounting plates 18A, 18B are one example of a relative reference mount. The relative reference mount can have any shape or configuration. Base mounting plates 18A and 18B mount to reference substrate 20 such that the optical components 14A and 14B are in substantial alignment. Substrate 20 is one example of a fixed reference mount and any appropriate fixed reference mount with an appropriate shape and configuration can be used.

The optical component modules of the present invention can be pre-assembled and pre-aligned to an appropriate reference such that a final optical device is fabricated by simply mounting the assembled optical modules on the reference substrate. An alignment compensation module (discussed below) can also be employed to assist in aligning the optical device. In the example of FIG. 1, reference substrate 20 is illustrated as a planar substrate which can be thought of as an optical "circuit board" which receives optical modules to form an optical, opto-electrical or opto-mechanical device.

Figure 2A:
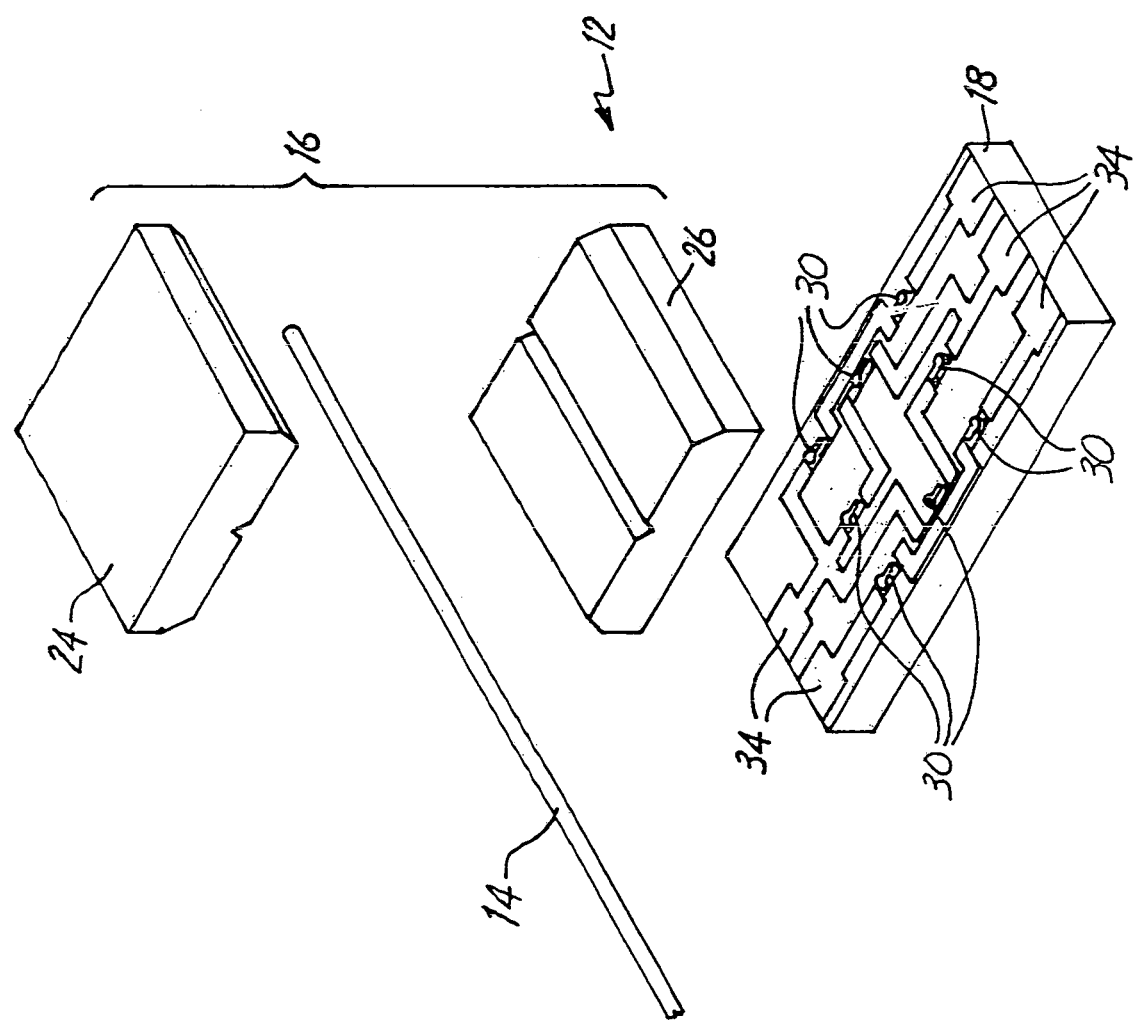
FIG. 2A is an exploded perspective view of an optical module shown in FIG. 1.

FIG. 2A is an exploded perspective view of optical module 12. In the specific example shown in FIG. 2A, optical component mount or holder 16 comprises upper component mount or holder 24 and lower component mount or holder 26. Again, other configurations are within the scope of the present invention. FIG. 2A illustrates one example mounting technique coupling optical component mount 16 to base mounting plate 18. In this example, a bonding material 30 is carried on a top surface of base mount plate 18. Material 30 preferably has at least two states. In one state, material 30 does not interfere or contact mount 16. Then, the optical component mount 16 can be positioned with up to six degrees of freedom relative to the base mounting plate 18. In another state, the material couples mounts 16 and 18 and thereby fixes the relative position therebetween. In one preferred embodiment, material 30 comprises a heat or chemically responsive (or activated) material such as solder or other bonding material. The solder can comprise any type of solder including plated solder, solder preforms, solder balls, solder paste, solder bumps, etc. including those types of solders used in flip chip electronic packages. However, other materials such as adhesives which dry, chemically react, or are activated by other means or other attachment techniques can be used. Preferably, the attachment technique allows some relative movement between the optical component mount 16 and the base mounting plate 18 prior to fixedly attaching the two. In embodiments where a heat activated material is used, heating elements (see FIG. 8B for more detail) can be provided to heat the material 30. For example, in FIG. 2A, heating elements are provided which are activated through the application of electrical energy through contact pads 34. This can be by electrically contacting pads 34 and applying a current therethrough. However, other heating techniques can be used. Of course, other techniques to change the state of bonding material can be used such as application of a curing component such as radiation or a chemical. Any appropriate adhesives including brazing, welding, bonding or other technique can be used. The bond can be activated using a technique including exposure to air, heat, chemicals, heat radiation (including light and UV), etc.

FIG. 2B is a bottom plan view of optical component mount 16 and lower mount 26 and shows bonding pads 40 which are arranged to mate with material 30 shown in FIG. 2A. Pads 40 can comprise, for example, a metal deposited on lower mount 26.

FIG. 3 is a front plan view of optical module 12 showing optical component mount 16 adjacent base mounting plate 18. In the arrangement shown in FIG. 3, material 30 is not initially in contact with optical component mount 16. As discussed below, material 30 can be activated to fill or fix the gap 32 between mount 16 and mount 18. However, other types of material 30 can be used in which there is actual contact between mounts 16 and 18 or material 30 fills gap 32 prior to bonding. In one preferred embodiment, prior to fixedly adhering mount 16 to mount 18 either component can be manipulated through up to six degrees of freedom as illustrated by the axes labeled X and Y in FIG. 3 along with another Z axis which is not shown and is perpendicular to a plane of the Figure, and rotation about the three axes. For some optical components, all six degrees of freedom may not be required for proper alignment and fewer degrees of freedom can be provided. FIG. 3 also illustrates example registration features 50. In the example embodiment of FIG. 3, each registration feature 50 is a protrusion which is configured to mate with reference substrate 20 as discussed below.

FIG. 3 also shows a component registration feature 60 formed in lower component mount 26 and a component registration feature 62 in upper component mount 24. In general, any registration technique can be used and the invention is not limited to the specific example illustrated herein. In the example embodiment, component registration features 60 and 62 comprise V-grooves which are configured to receive an optical component such as optical component 14. The optical element 14 can be coupled to the optical component mount using, for example, an adhesive or solder. Optical component 14 is preferably fixed to component mount 16 to maintain alignment relative to registration features 50 of relative reference mount 18.

Figure 4:
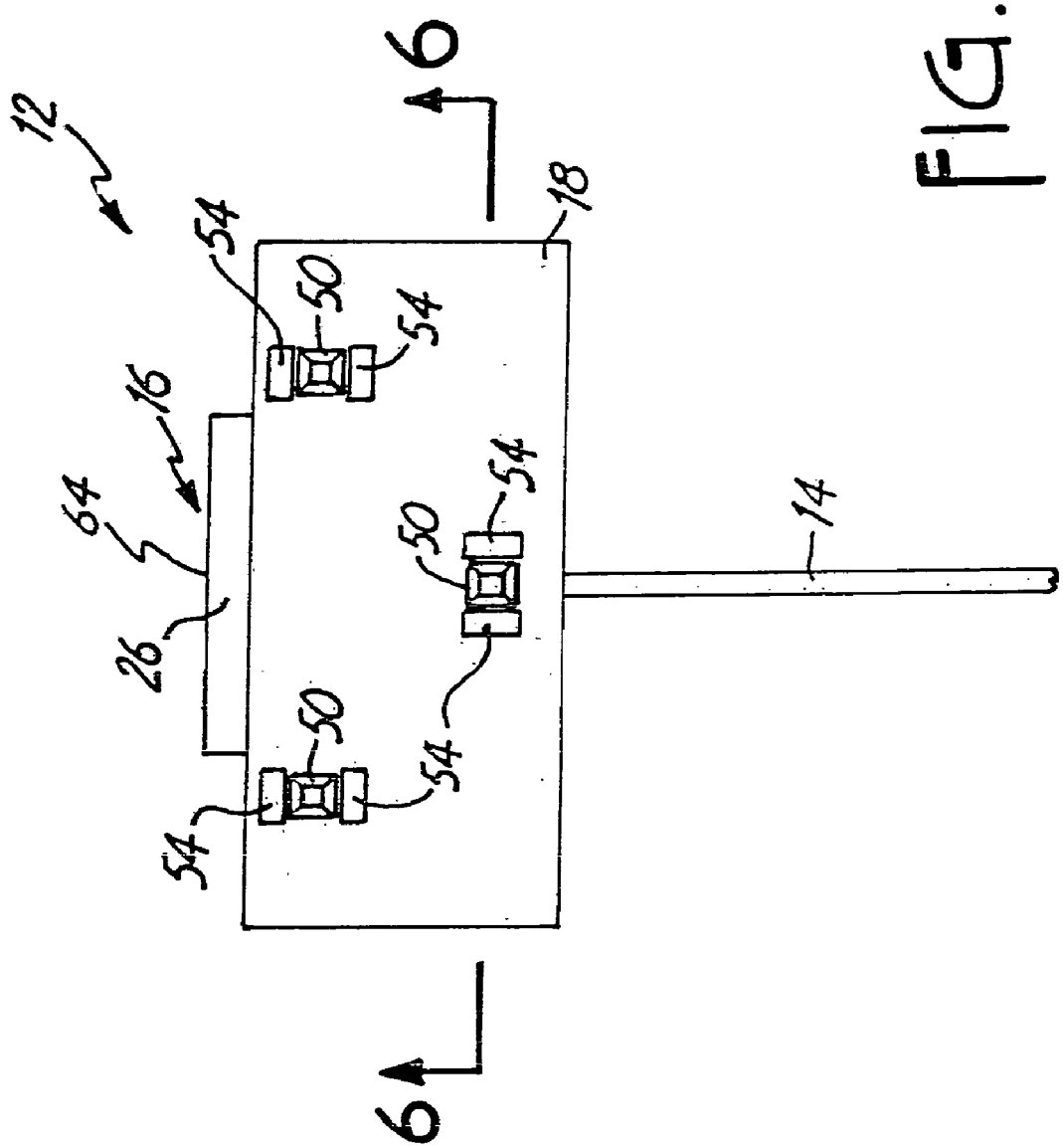
FIG. 4 is a bottom plan view of the optical module of FIG. 1.

FIG. 4 is a bottom plan view of optical module 12 which shows base mounting plate 18 and a portion of lower optical component mount 26 of optical component mount 16. Pads 54 on base mounting plate 18 can bond with bonding material 72. The bottom plan view of FIG. 4 illustrates an interface surface 64 of optical component mount 16. Interface surface 64 is an input, output or input/output face for the optical component 14 shown in FIG. 3. In some embodiments, the interface surfaces of adjacent optical modules are in abutting contact. In some embodiments, a refractive index optical matching material fills any gap between adjacent interface faces to provide improved coupling and reduce reflections. For example, the optical matching material may be in a solid, gel or liquid form. In one example embodiment, interface surface 64 is a plane which forms an angle relative to a plane perpendicular to the direction of propagation of optical fiber 14. For example, this can be eight degrees. An angled surface 64 of the optical component 14 can be preferable because it reduces the amount of reflected light which is coupled back into an optical fiber. If two modules are in close proximity or in abutting contact, the adjacent optical component mount would have a complimentary angle. In embodiments where an angle or a specific interface finish is desired, interface surface 64 can be shaped or formed using an appropriate process such as a lapping process, chemically machining, machining, etc., or an additive process, to achieve the desired configuration. For example, after the optical component 14 is secured within the optical component mount 16, the surface 64 can be lapped to achieve the desired angle or surface finish. Such techniques can also be used to ensure that a face of the optical component is flush with the interface surface 64. However, in some embodiments, it may be desirable to have the optical component 14 either recessed or protruding from interface surface 64.

Figure 7A:
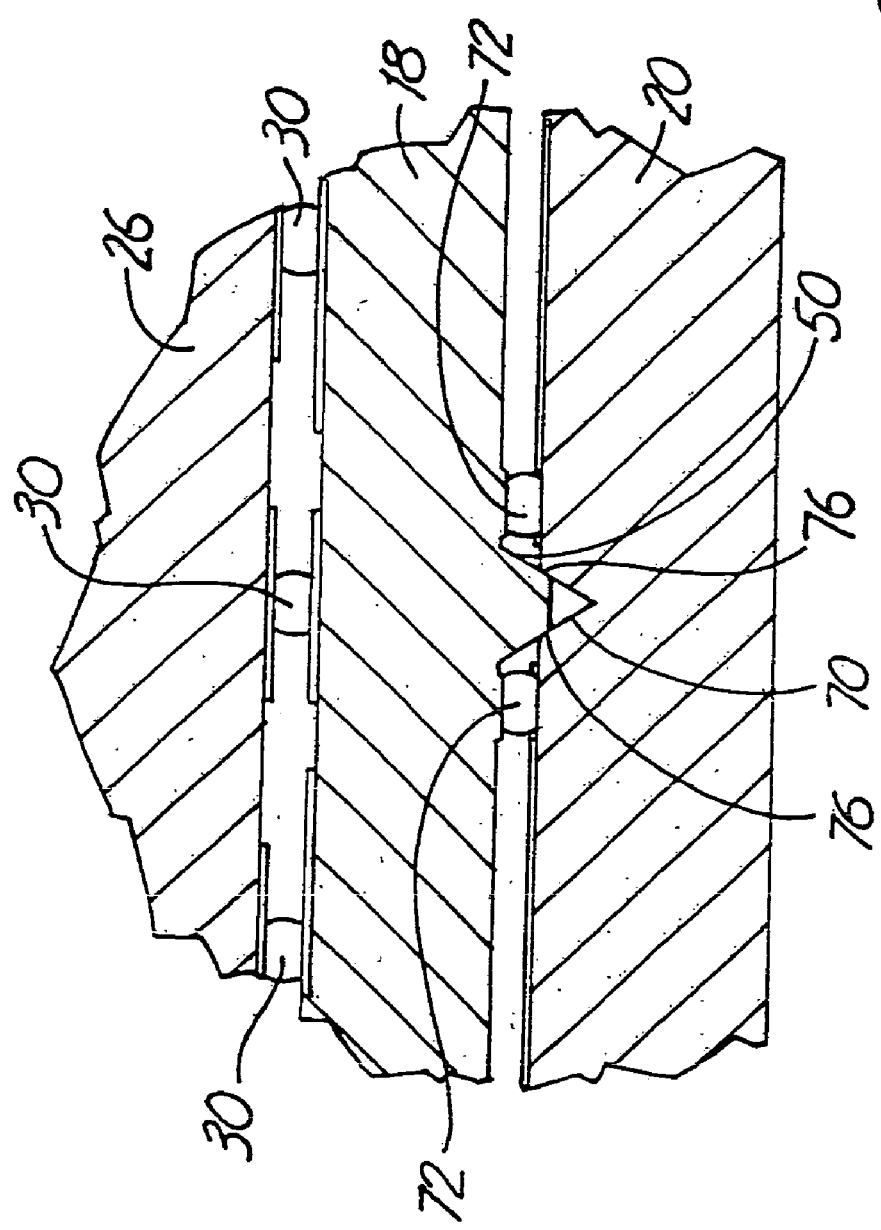
FIG. 7A is a cross-sectional view of registration features used to register the relative reference mount with a fixed reference mount shown in FIG. 1.

FIG. 5 is a top plan view of reference substrate 20 configured to receive optical modules 12A and 12B shown in FIG. 1. Registration features 70A and 70B are provided to receive registration features 50 on respective optical modules 12A and 12B. In the example embodiment, features 70 are precisely defined depressions configured to register the protrusions of registration features 50 shown in FIG. 3 or 4. This example embodiment is shown in FIG. 7A in more detail. The dashed outlines indicate the placement of base mounting plates 18A and 18B. This configuration provides an example of a kinematic-type registration or alignment technique. One example kinematic technique is described in U.S. Pat. No. 5,748,827, entitled "TWO-STAGE KINEMATIC MOUNT". Any appropriate registration or alignment technique can be used, however, preferably the registration technique should be accurate and provide high repeatability. In the example embodiment, a heat activated material 72 such as solder is provided which can be heated to fixedly adhere the optical modules to the reference substrate. In such an embodiment, contact pads 74 electrically couple to heaters which are used to heat material 72. Material 72 is preferably aligned with pads 54 shown in FIG. 4. For example, pads 54 can be of a material to which material 72 will strongly adhere. For example, pads 54 can comprise a metal to which solder will adhere. Pads used to promote adhesion can have multiple layers. For example, one layer to bond with the bonding material and another layer to bond with the mount, such as mounts 16, 18 or substrate 20.

FIG. 6 is a cross-sectional view showing optical module 12 mounted taken along the line labeled 6-6 in FIG. 4 and including substrate 20. This view shows the assembled configuration in which the optical module 12 is coupled to the reference substrate 20 and component holder 16 is coupled to base mounting plate 18.

FIG. 7A is an enlarged cross-sectional and FIG. 7B is an enlarged exploded view showing v-groove registration feature 70 and protruding registration feature 50. The relative spacing between plate 18 and substrate 20 can be controlled by adjusting the angle or widths of the walls of v-groove 70 or of protrusion 50. If fabricated in properly oriented, single crystal silicon, the angle is typically fixed by the crystal structure of the material and the width can be adjusted to control the spacing. The coupling between plate 18 and substrate 20 actually occurs at line contact points 76.

Figure 8A:
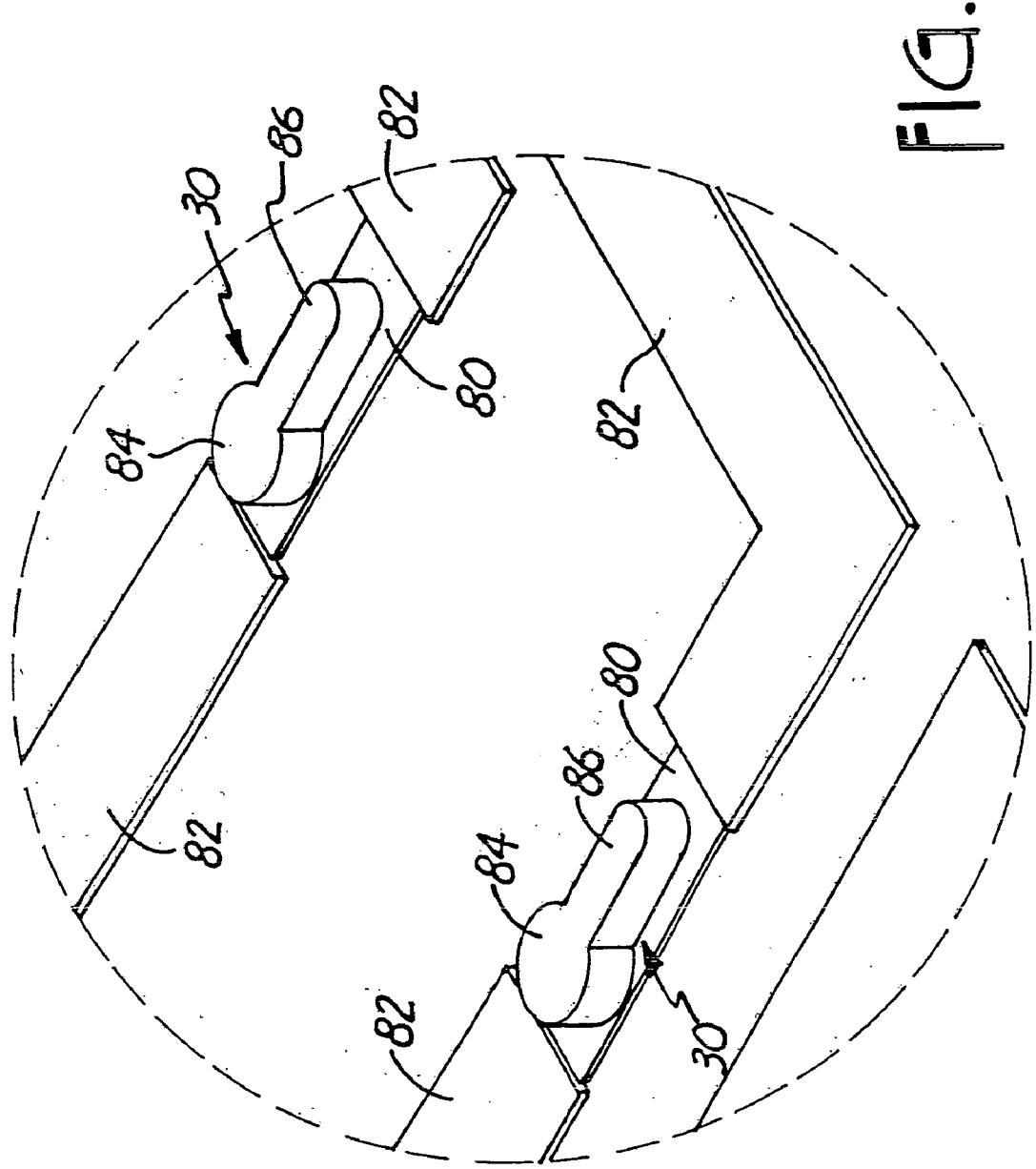
FIG. 8A is a perspective view showing bonding material used with the present invention.

FIG. 8A is a perspective view showing bonding material 30 in greater detail and FIG. 8B is a cross-sectional view showing bonding material 30 between lower component mount 26 and mounting plate 18. Bonding material 30 is carried on heating elements 80 which are electrically coupled to conductors 82. Heating elements 80 can comprise a resistive elements such as a refractory metal or alloy such as tantalum, chromium or nichrome and be configured to melt material 30 when sufficient electrical current is supplied through conductors 82.

The cross-sectional view shown in FIG. 8B illustrates the configuration near heating element 80. FIG. 8B is a diagram of thin film layers and is not to scale and shows features, such as contacts 34 which are remote from the heater element 80 and near the edge of mounting plate 18. Element 80 is shown electrically coupled to contacts 34 through electrical conductors 82. An electrical insulating layer 87 can optionally be positioned between element 80 and material 30 to increase the amount of electrical current flowing through element 80. Additional layer or layers 85 can be deposited on insulator 87 to promote adhesion or provide other characteristics or qualities as desired. This is known in the art of metal deposition as "under-bump metallurgy." Thermal (and/or electrical) isolation layers 89 can also be applied to reduce the transfer of thermal energy to the surrounding components. Preferably, heating element 80 is designed to operate in a thermally adiabatic regime. As current flows through the heating element 80 and it begins to warm, the thermal energy flows into the bonding material 30. Similarly, the structure preferably is configured to reduce heat flow into the surrounding areas. This reduces the energy required to activate the bonding material, reduces the heating and setting times and reduces the thermal stress applied to the surrounding material. Element 80 can have any appropriate shape including straight, bifilar, serpentine, etc. Solder provides a bonding material which can be quickly attached (in less than 100 mSec) and allows "reworking" the bond by reheating the solder.

The various materials can be selected as desired for the appropriate physical properties. $SiO_2$ provides good thermal and electrical isolation and is easily processed. Of course, other materials including other oxides or organic films can be used. The electrical isolation layer 87 is preferably relatively thin and provides high thermal conductivity. Silicon nitride is one example material. The conductors 82 can be any conductive material however, preferable materials include those which are easily deposited such as thick refractory metals, gold or aluminum. The material or materials for pads 54 can be any appropriate material which adheres to the bonding material 30. Examples include, titanium, gold, nickel, etc. The thickness of the various layers should also be selected to reduce the thermal load on the heating element. Pad 54 is shown with layers 54A and 54B. Layer 54A can be of a material suitable for bonding to thermal isolation layer 89. For example Ni if layer 89 is $SiO_2$. Layer 54B is configured to bonding with bonding material 30 and may be, for example, gold, nickel, titanium, or other materials.

Figure 8D:
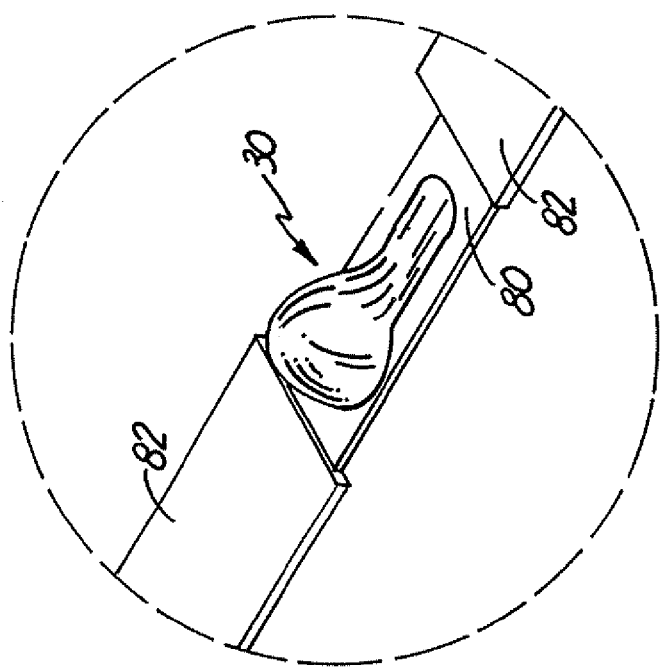
FIG. 8D is an enlarged view of the bonding material which illustrates deformation of the material after heating.
Figure 8C:
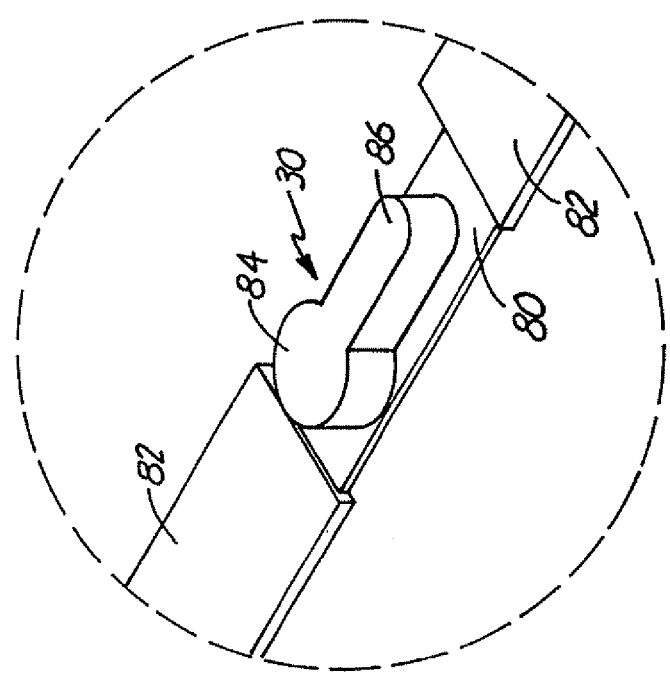
FIG. 8C is an enlarged view of the bonding material.

As shown in FIG. 8C, in one embodiment, material 30 comprises a solder formed with a large surface area region 84 and a tapered region 86. When material 30 is melted, surface tension causes the liquid material from tapered region 86 to flow toward large surface area region 84 and cause large surface area region 84 to expand in an upward direction as illustrated in FIG. 8D. This configuration is advantageous because it allows the orientation of component mount 16 to be adjusted as desired (through the six degrees of freedom as discussed with respect to FIG. 3) without any interference from the bonding material 30. Bonding material only contacts the two surfaces when heat is applied and the material fills the gap between the two components. Similarly, with respect to mounting base mounting plate 18 to reference substrate 20, plate 18 can be securely registered within feature 70 prior to application of the bonding material 72 or actuation of heating elements 80. Such a solder flow technique is described in U.S. Pat. No. 5,852,179, entitled "SOLDER BUMPS AND STRUCTURES FOR INTEGRATED REDISTRIBUTION ROUTING CONDUCTORS", issued Apr. 6, 1999 which is incorporated herein by reference.

As mentioned above, other bonding techniques including adhesives and UV curing techniques can be used and the invention is not limited to solder. However, in one aspect, the bonding technique can advantageously use the surface tension developed in the bonding material. Note that the solder or adhesive can be electrically conductive to provide electrical contacts to the optical device between the various layers, or to adjacent electronic circuitry. Thermally conductive materials can be used to help dissipate heat. In another aspect, two bonding materials are used, which can be the same or different and can be applied simultaneously or sequentially. For example, after the solder discussed herein is applied, a second bonding material can fill the gap to provide additional stability. However, shrinkage or other shape changes of the bonding material should be addressed to maintain alignment. In some embodiments, roughness or texturing the surfaces using any appropriate technique can be used to promote adhesion of the bonding material.

Figure 9:
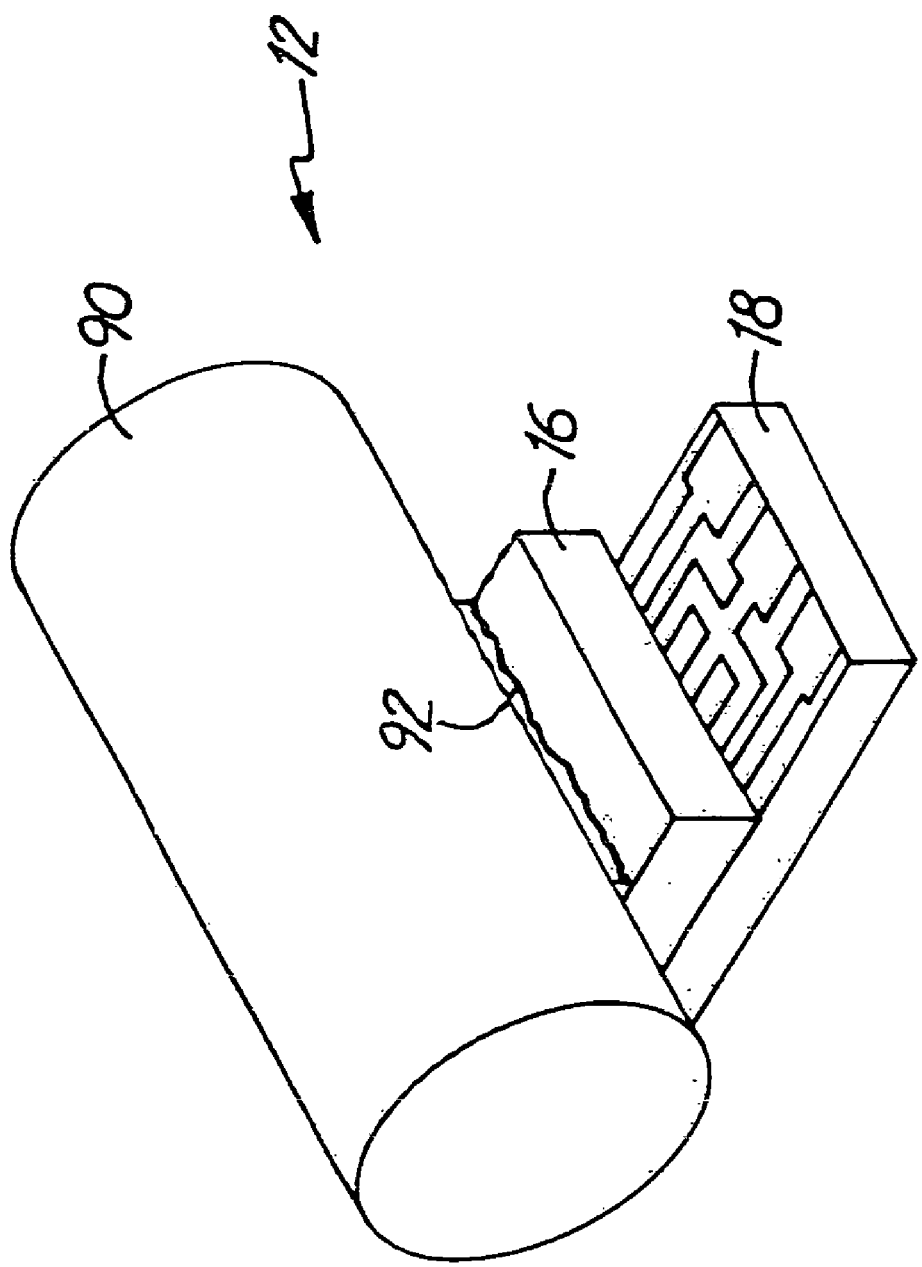
FIG. 9 is a perspective view showing an optical module of the present invention which includes a Gradient Index (GRIN) lens.
Figure 10:
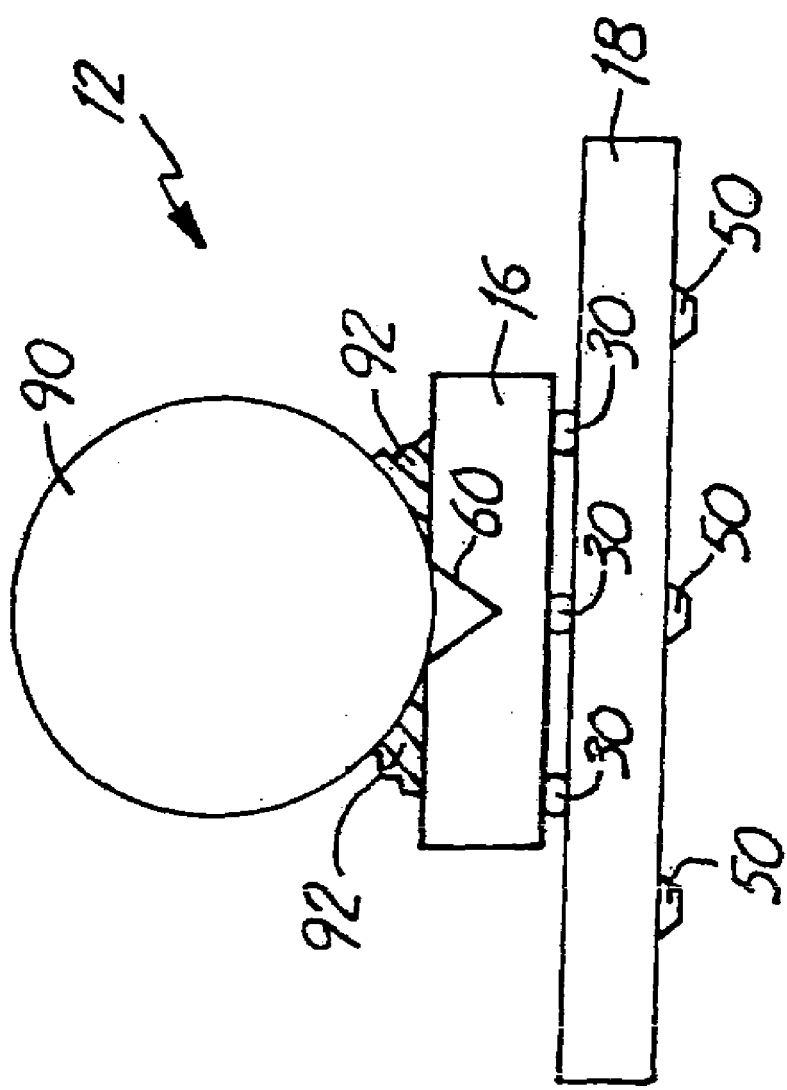
FIG. 10 is a front plan view of the optical module of FIG. 9.

Component 14 can be any type of optical opto-electrical or opto-mechanical element including active or passive elements. In the above examples, optical element 14 is shown as an optical fiber. To illustrate one alternative example optical module 12, in FIGS. 9 and 10 an optical element 90 is shown which comprises a GRIN lens. FIG. 9 is a perspective view showing lens 90 held in component mount 16 which coupled to base mounting plate 18. FIG. 10 is a front plan view. Lens 90 is registered with a registration groove 60. Additional support bonding material 92 is provided to secure lens 90 to component mount 16. This can be an adhesive, solder or other bonding material.

The various components can be fabricated using any appropriate technique or material. In one embodiment, the depressions or grooves for various registration features are formed by anisotropically etching oriented single-crystal silicon. Protrusions can be formed in an analogous, complimentary manner. The configuration should preferably eliminate or substantially reduce movement in any of, the six degrees of freedom. This is required to achieve sub-micron spacial reproducibility between components. For example, a [100] orientation of single crystal silicon allows the formation of such features which can be orientated at 90 degrees to one another. Any appropriate etching or formation technique can be used. One common anisotropic etch technique uses KOH and masking to define the desired features. Regarding the various conductive layers, heating element layers, and insulating layers, any appropriate sputtering, plating, evaporation or other fabrication technique can be used.

The various aspects of the present invention discussed above provide prealigned optical modules which can reduce or eliminate the effects of component variability. In the above example, this is achieved by adjusting the component mount (holder) relative to a registration feature on the base mounting plate. The bonding material fixes the relationship between the component and the registration feature. Precise registration features are provided on the base mounting plate 18 such that it can be inserted into an optical "circuit board" to fabricate devices which comprise multiple optical component modules. The optical modules are well suited for automated assembly of optical devices because they are in standardized packages, prealigned and can be easily mounted on a reference substrate. Optical modules can be manually placed into the optical "circuit board" or the process can be automated. The particular optical modules are preferably standardized to facilitate such automation. Further, this configuration allows assembly of devices in a "top downward" fashion in which optical modules are moved downward into an optical "circuit board" which facilitates process automation. Further, because different modules are fabricated using similar materials, variations due to thermal expansion will affect all modules in a similar way such that the alignment between adjacent modules on the optical "circuit board" is maintained.

Electrical conductivity of the solder bond can be used advantageously to provide an electrical connection to electrical components on the module. The solder can be heated in any order or combination including simultaneously. The position and sequence of the heating of the solder can be configured to reduce or compensate for deformation in the components including thermal deformation. Solder can also be used advantageously because the solder can be reheated allowing the component to be repositioned, removed, replaced, and/or repaired.

In one general aspect, the present invention provides an optical device comprising a plurality of optical modules in which optical variations due to component variability are eliminated or significantly reduced. This provides uniformity across multiple optical modules which is particularly desirable for automated assembly. In one aspect, the invention can be viewed as providing several stages of alignment of an optical device. A first stage of alignment is provided between the component mount (holder) and the optical component, for example using a V-groove registration feature as shown or other technique. A second stage of alignment is between the optical component mount and registration features of the relative reference mount. This also eliminates or reduces alignment variations due to component variability. A third stage of alignment occurs between the optical module and the reference substrate. A final alignment stage occurs using an alignment compensation to remove residual alignment errors. In another example aspect, the optical element has an optical characteristic which varies in space relative to at least one dimension. The optical component is aligned with reference features on the relative reference mount by fixing the position of the component mount relative to the registration features of the relative reference mount to thereby align the optical characteristic. In one aspect, the first stage of alignment is eliminated and the optical element is directly aligned with the registration features of the relative reference mount and no mount/holder is used.

The use of alignment compensation modules greatly relaxes optical module and fixed reference tolerances at the small additional complexity of performing a final alignment with an alignment compensation module. In one aspect, optical modules are prealigned such that errors in the alignment of an optical characteristic of the module due to component variability are greatly reduced. Active prealignment can be performed in which light interacts with the optical component and is used to adjustment the alignment of the component to compensate for errors introduced due to variability of the component. Such active prealignment refers to alignment in which light is actively passed through, reflected by, received by or generated by an optical component and that component is aligned with respect to registration features of a relative reference mount which holds the component. An example fiber optic demultiplexer and laser transmitter will now be presented for illustrating alignment compensation modules. However, alignment compensation modules may be used with other optical devices and other types of optical components.

Figure 11:
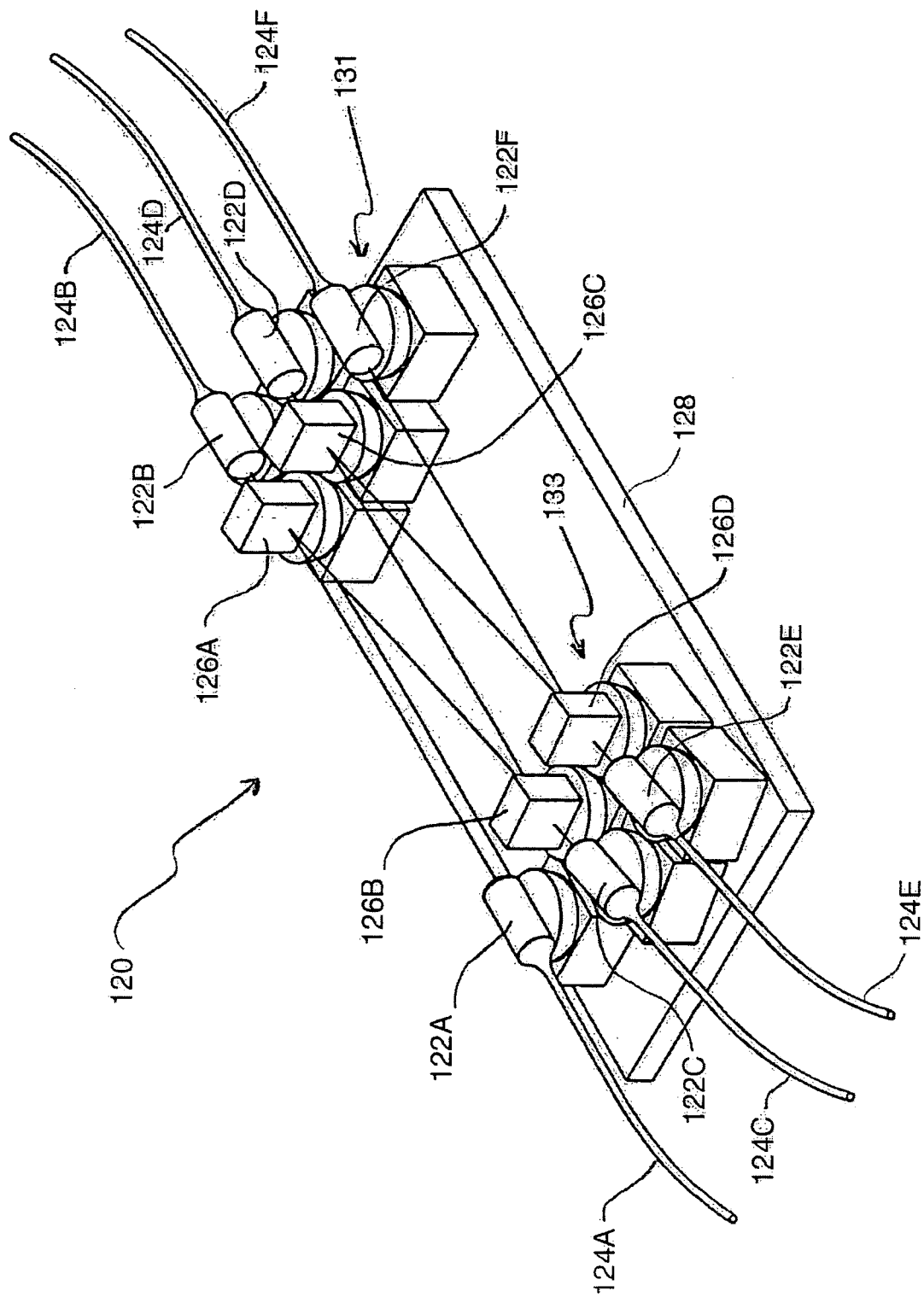
FIG. 11 is a perspective view of a fiber optic demultiplexer device.
Figure 12:
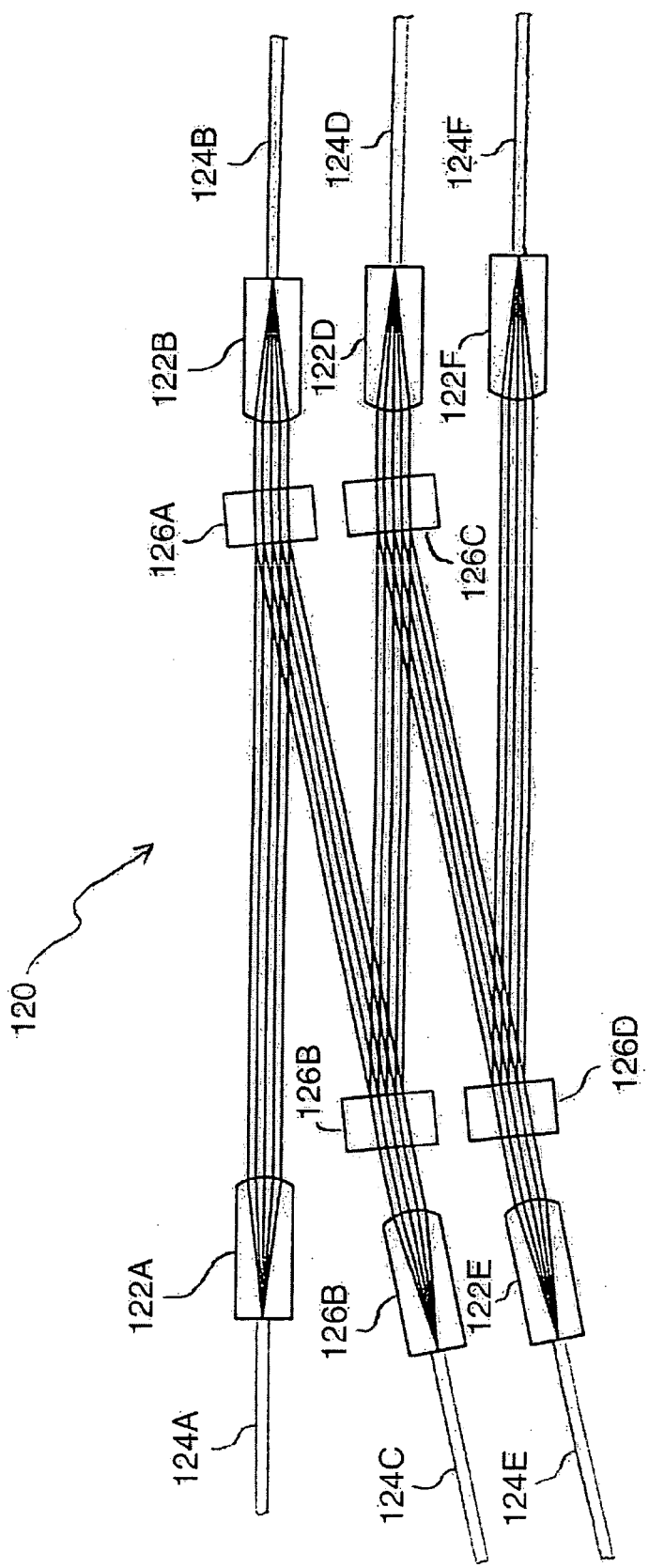
FIG. 12 is an optical schematic representation of the fiber optic demultiplexer device of FIG. 11.

FIG. 11 is a perspective view of fiber optic demultiplexer 120. The operation of demultiplexer 120 will be briefly described by referring to the optical schematic of FIG. 12. Input fiber 124A typically carries several signals that are encoded onto different optical wavelengths. The output of fiber 124A is collimated by lens 122A. Optical filters 126 are typically coated with multiple dielectric layers that transmit certain portions of the optical spectrum and reflect the remaining portions. Optical filter 126A transmits a certain portion of the optical spectrum in order to extract or demultiplex one or more signals from the signals encoded onto input fiber 124A. Light transmitted by optical filter 126A is focused by lens 122B onto output fiber 124B. The combination of filter 126A and lens 122B demultiplex the desired signal(s) onto output fiber 124B. Additional signals from fibers 124C-E are sequentially demultiplexed by optical filters 126B, 126C, and 126D and lenses 122C, 122D, and 122E respectively. Any remaining signals are then focused by lens 122F onto fiber 124F.

Figure 13:
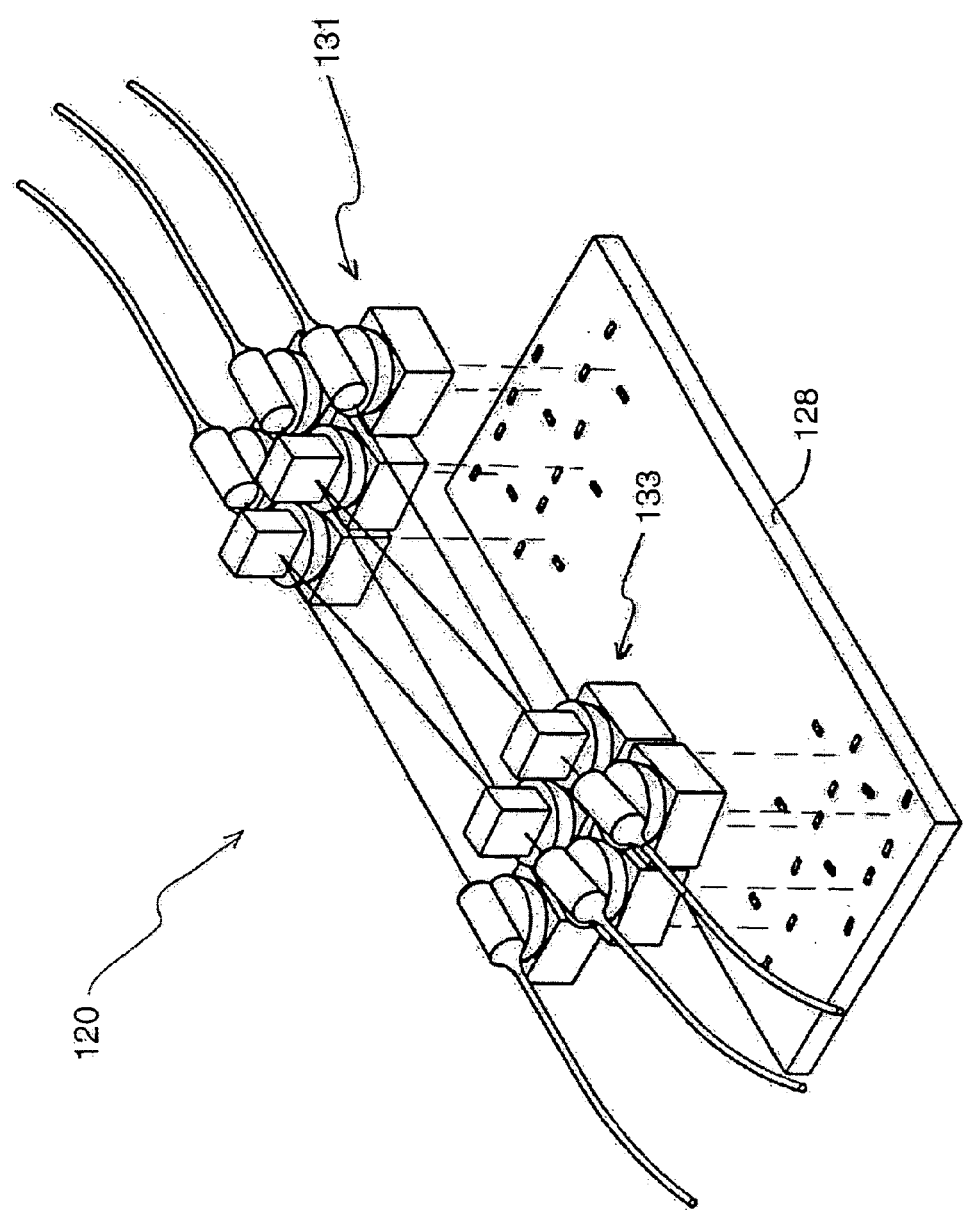
FIG. 13 is an exploded perspective view of the fiber optic demultiplexer device of FIG. 11.
Figure 14:
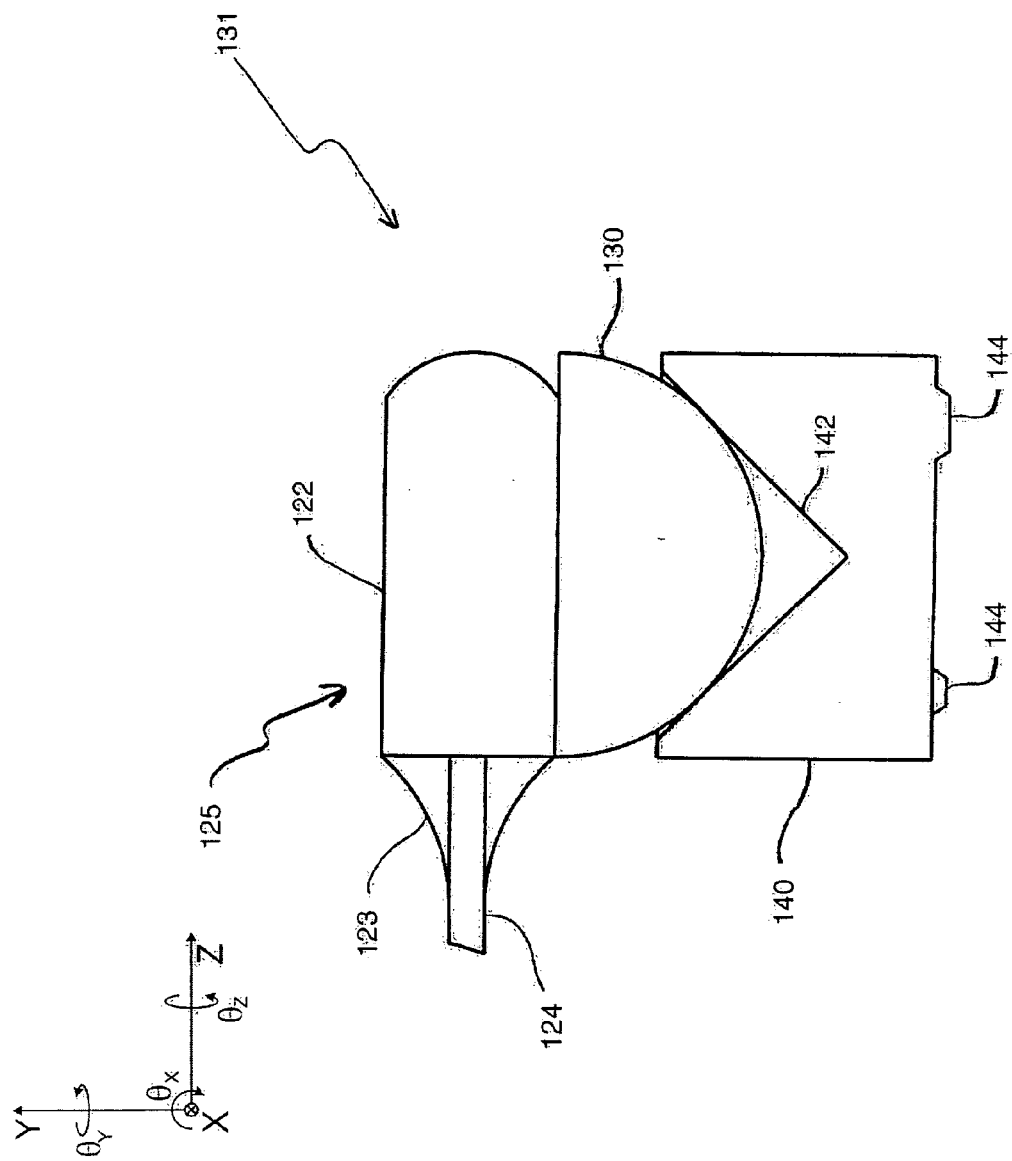
FIG. 14 is a side sectional view showing a fiber optic collimator module.

The exploded perspective view of demultiplexer 120 in FIG. 13 shows prealigned fiber optic collimator modules 131 and prealigned optical filter modules 133. FIG. 14 is a side sectional view of fiber optic collimator module 131. Lens 122, strain relief material 123, and fiber 124 form fiber optic collimator 125 such as those manufactured by Lightpath Technologies of Orlando, Fla. Collimator pointing error tolerances of 0.1-1.0 degrees are common. To a first order approximation, the pointing error of a fiber optic collimator is the angular propagation direction of the collimated beam that maximizes the amount of light coupled into the fiber as measured with respect to the angle defined by the outside mechanical dimensions of lens 122 or another mechanical feature such as a cylindrical metal tube that houses lens 122. Lens 122 is attached to spherically shaped lens mount 130. Features on top of lens mount 130, such as a v-groove or channel, aid in securing and aligning lens 122 to mount 130. Receptacle 142 in relative reference mount 140 receives mounts 130. Receptacle 142 is shown as conical shaped depression in relative reference 140. Mount 130 swivels in receptacle 142 in the $\theta_X$ direction and $\theta_Y$ direction to affect angular alignment of collimator 125. Collimator module registration features 144, shown as protrusions, are provided on relative reference 140 and are similar to registration features 50 shown in FIGS. 3 and 4. Collimator module registration features 144 mate with matching registration features on fixed reference 128. In one embodiment, collimator module registration features 144 substantially constrain movement in six degrees of freedom when physically coupled to the mating registration features (shown in FIG. 13) in fixed reference 128. The pointing axis of collimator 125 is actively prealigned in the $\theta_X$ direction and $\theta_Y$ direction relative to optical module registration features 144. Upon proper angular alignment of collimator 125 with respect to registration features 144, mount 130 may be secured to relative reference 140 by appropriate means such as adhesive, solder, welding, or other appropriate attachment technique. A substantial percentage of the aforementioned collimator pointing error is removed prior to inserting fiber optic collimator module 131 into fixed reference 128. Receptacle 142 may have other shapes such as spherical sockets, holes, or holes with chamfers that allow mount 130 to swivel on the receptacle. Collimator 125 may also be secured to a mount that contains a receptacle and the relative reference may contain a spherical feature to permit angular adjustment of the collimator 125.

FIG. 15 is a side sectional view of prealigned optical filter module 133. Optical filter 126 is attached to spherically shaped filter mount 132. Receptacle 148 in relative reference mount 146 receives mount 132. Mount 132 swivels in receptacle 148 in the $\theta_X$ direction and the $\theta_Y$ direction to affect angular alignment of optical filter 126. Optical module registration features 150 are provided on relative reference 146. The angle of optical filter is actively prealigned in the $\theta_X$ direction and $\theta_Y$ direction relative to optical module registration features 150. Upon proper angular alignment of optical filter 126 with respect to optical module registration features 150, mount 132 may be secured to relative reference 146 prior to inserting relative reference 146 into fixed reference 128 by appropriate means described above such as adhesive, solder, welding, or other appropriate attachment technique. Fixed reference 128 has registration features as shown in FIG. 13 that mate with optical module registration features 150. The optical module registration features 150 typically constrain movement in six degrees of freedom when physically coupled to the mating registration features in fixed reference 128.

Lens 122 and filter 126 may be secured to their respective mounts by appropriate means such as adhesive, solder, welding, or other appropriate attachment technique. Mounts 130 and 132 may be transparent to allow appropriate radiation to secure mounts 130 and 132 to receptacles 142 and 148, respectively, such as with adhesive or by laser soldering. Relative references 140 and 146 may also be transparent to facilitate adhesive curing or laser soldering. The mounts and relative references may be of appropriate materials, or a combination of materials, such as metal, glass, ceramic, semiconductor, or plastic and have coatings to facilitate bonding of the mounts to the relative references. Lens mounts 130 and filter mounts 132 may also contain additional mechanical features to aid in gripping, manipulating and aligning the mounts. The various mounts and fixed references may also be made by molding.

Many sources of alignment error may accumulate during the manufacture of an optical device such as that of demultiplexer 120. These error sources include slight errors associated with actively prealigning and securing optical components and optical component mounts into optical modules, slight mismatches between the optical module registration features and the fixed reference registration features, and small errors in the position, size, and orientation of the fixed reference registration features. For example, degradation of the light coupling efficiency into fiber 124F shown in FIGS. 11 and 12 may occur due to the error sources just mentioned for the various collimator modules 131, optical filter modules 133, and fixed reference 128. The statistical accumulation of these errors may leave a residual alignment error. Use of an alignment compensation module substantially removes residual alignment errors as will be explained with reference to FIGS. 16-20.

Figure 16:
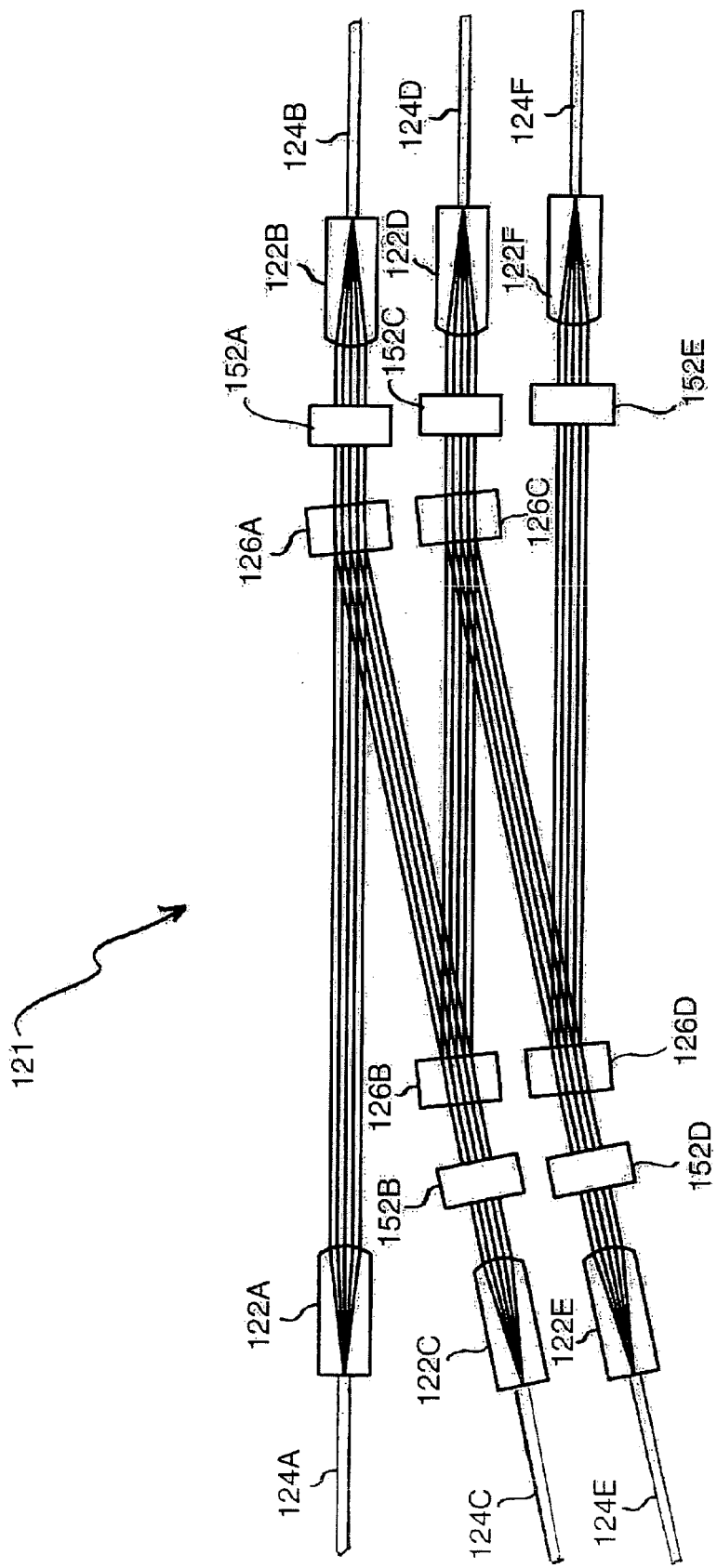
FIG. 16 is an optical schematic representation of a fiber optic demultiplexer with alignment compensation modules.

FIG. 16 is an optical schematic representation of demultiplexer 121 having numbering similar to that used above. Demultiplexer 121 is similar to demultiplexer 120 shown in FIG. 12 with addition of alignment compensation modules 152A-E, shown in block diagram form, between optical filters 126 and lenses 122.

Figure 17:
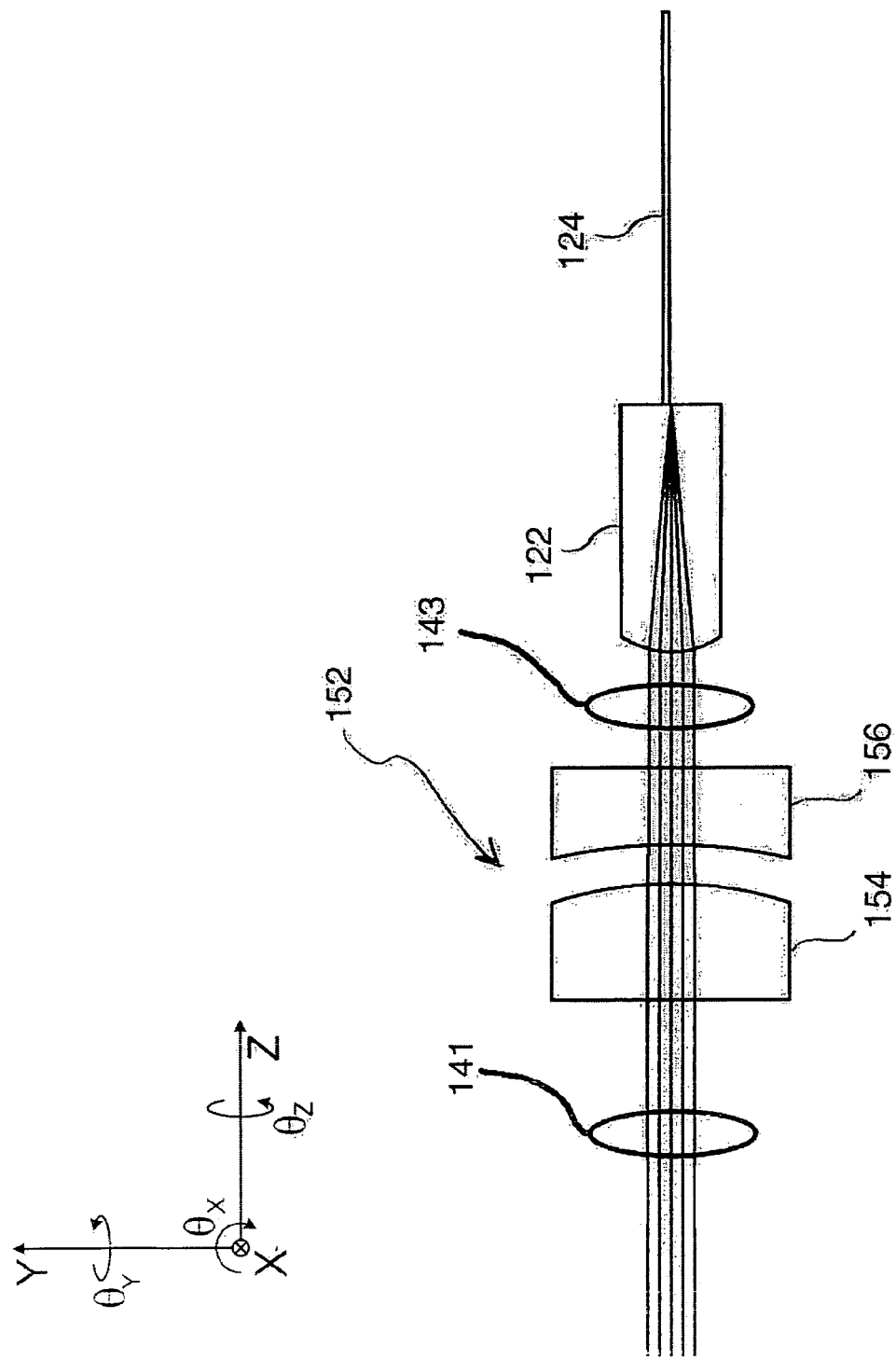
FIG. 17 is an optical schematic representation showing a residual alignment error and an alignment compensation module with an afocal lens pair.

An optical schematic of an alignment compensation module 152 is shown in FIG. 17. Substantially collimated light beam 141, shown propagating along a Z axis, passes through alignment compensation module 152 where it is refracted by lenses 154 and 156 to produce substantially collimated light beam 143. Light beam 143 is then focused by lens 122. A residual alignment error is also illustrated in FIG. 17, albeit greatly exaggerated. That is, there is a residual alignment error between the position of the light focused by lens 122 and the core of fiber 124. Lens 154 is a relatively weak lens with slightly positive focal length and lens 156 is a relatively weak lens with slightly negative focal length. Together, lenses 154 and 156 form an afocal pair and do not appreciably change the state of collimation of a light beam.

Figure 18:
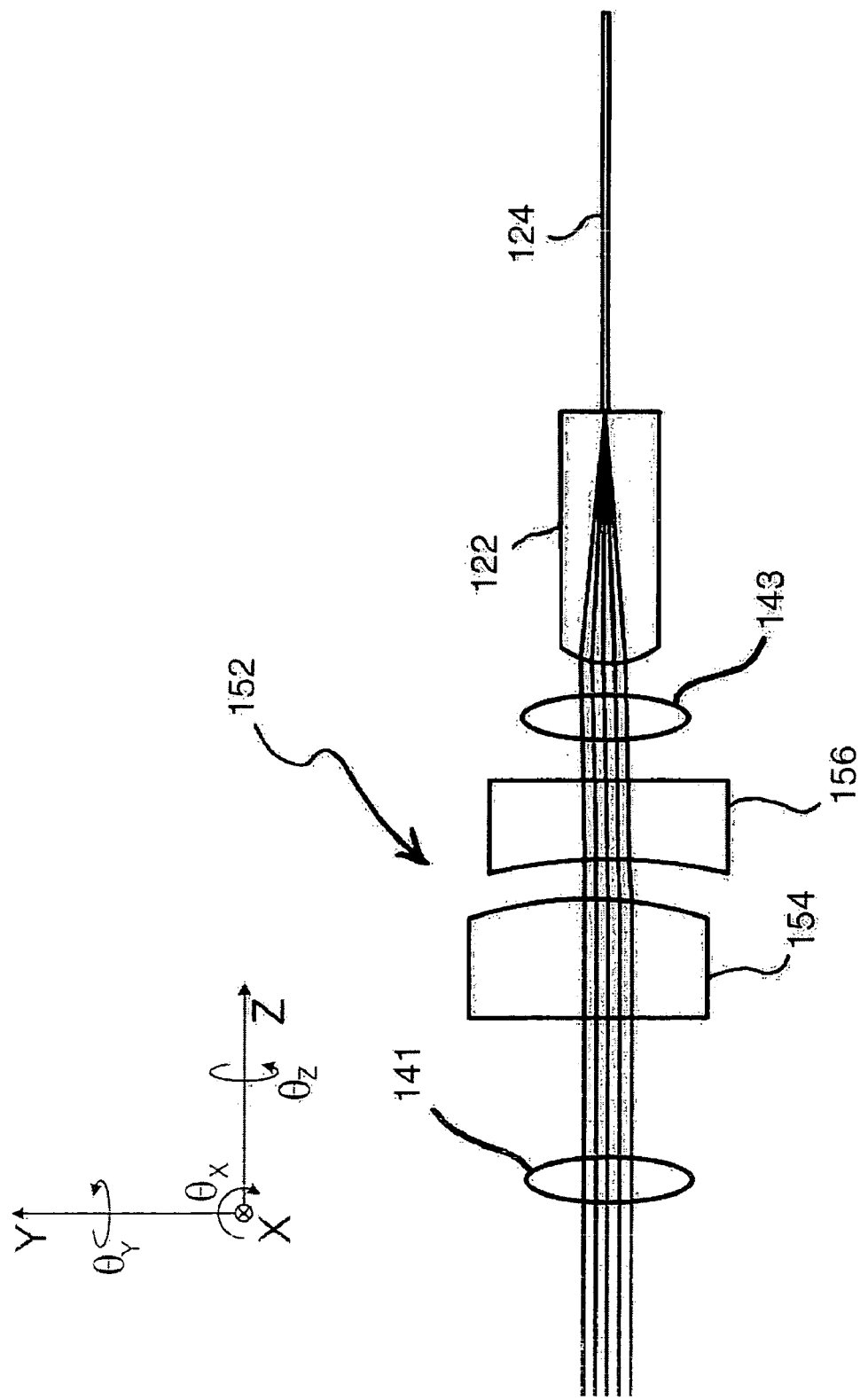
FIG. 18 is an optical schematic representation showing the removal of an alignment error by linearly displacing one of the lenses of FIG. 17.

In FIG. 18, lens 154 has been displaced in the Y direction, compared to its original position in FIG. 17. The angular propagation direction of light beam 143 is now changed, relative to the original angular propagation direction of light beam 141, so that light focused by lens 122 is displaced in the Y direction and coupled into the core of fiber 124 with high efficiency. Lens 154 may also be displaced in the X direction to compensate for alignment errors in the X position of the focused light beam. Displacing, or decentering, lens 156 has a similar effect on alignment compensation, although it must be displaced in the opposite direction of lens 154 since it has a negative focal length. The angular propagation direction of light beam 143 entering lens 122 may be adjusted by appropriately displacing lenses 154 and 156 in the X-Y plane in order to compensate for residual alignment errors. In one embodiment, lenses 154 and 156, of alignment compensation module 152, are displaced independently and in substantially orthogonal directions to improve convergence of the alignment compensation.

Figure 19:
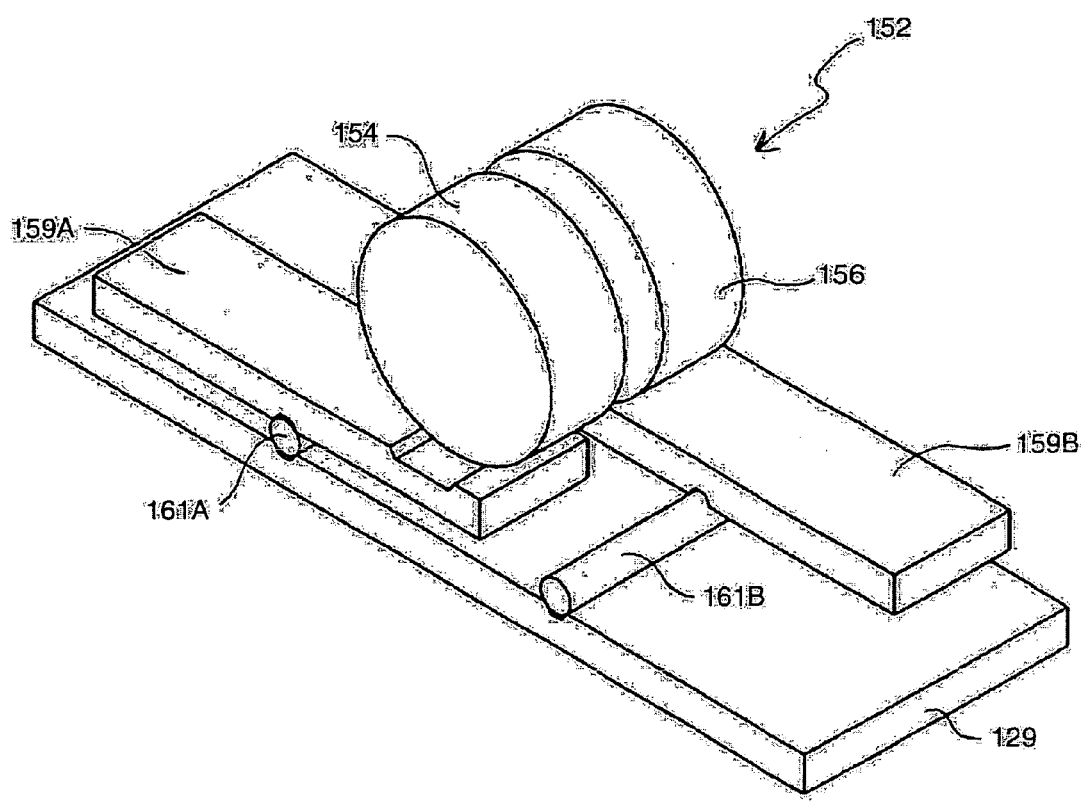
FIG. 19 is a perspective view of an alignment compensation module with a lever arm alignment structure.
Figure 20:
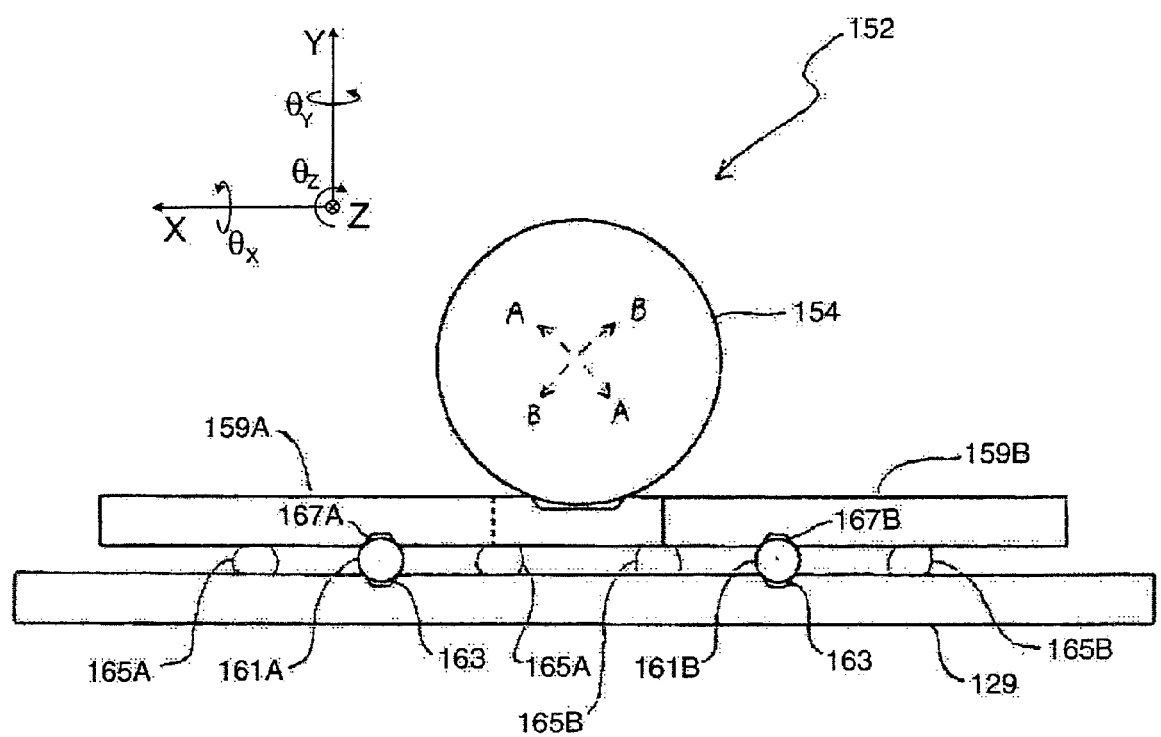
FIG. 20 is a front plan view of the alignment compensation module of FIG. 19.

FIG. 19 shows a perspective view of an alignment compensation module 152 on a fixed reference 129. Fixed reference 129 is similar to fixed reference 128 shown in FIG. 11 with the addition of alignment compensation modules in front of lenses 122B, 122C, 122D, 122E, and 122F. Lenses 154 and 156 are mounted to tilt plates 159A and 159B, respectively. This is an example of a lever arm alignment structure for adjusting and securing lenses 154 and 156. A front view of alignment compensation module 152 is shown in FIG. 20. Pivots 161A and 161B rest in v-grooves 163 of fixed reference 129. V-grooves 167A and 167B mate with pivots 161A and 161B and allow tilt plates 159A and 159B, respectively, to rotate in the $\theta_Z$ direction. As tilt plate 159A rotates in the $\theta_Z$ direction, the center of lens 154 is displaced along a nearly linear path labeled A-A. Likewise, as tilt plate 159B rotates in the $\theta_Z$ direction, the center of lens 156 is displaced along a nearly linear path labeled B-B that is substantially perpendicular to path A-A. Residual alignment errors may be substantially eliminated by tilting plates 159A and 159B to remove residual alignment errors and then secured in place with solder 165A and 165B, respectively, or other appropriate means such as with adhesive or by welding. Other mechanical configurations are possible to allow tilt plates 159A and 159B to rotate, such as ball bearings in receptacles.

The focal lengths of lenses 154 and 156 can be chosen such that displacements of lenses 154 and 156 result in much smaller displacements of focused light in the X-Y plane of fiber 124 as can be seen from FIGS. 17 and 18. Choosing the focal lengths of lenses 154 and 156 in this fashion eases the accuracy and resolutions requirements for manipulators that tilt plates 159A and 159B. Also, any displacement errors of lenses 154 and 156 that occur during the securing of plates 159A and 159B result in negligible displacement errors of focused light in the X-Y plane of fiber 124. Alignment compensation module 152 shown in FIGS. 19 and 20 allows "top downward" assembly onto fixed reference 129 as well as manipulation of tilt plates 159A and 159B from above which is advantageous for an automated assembly system.

Figure 21:
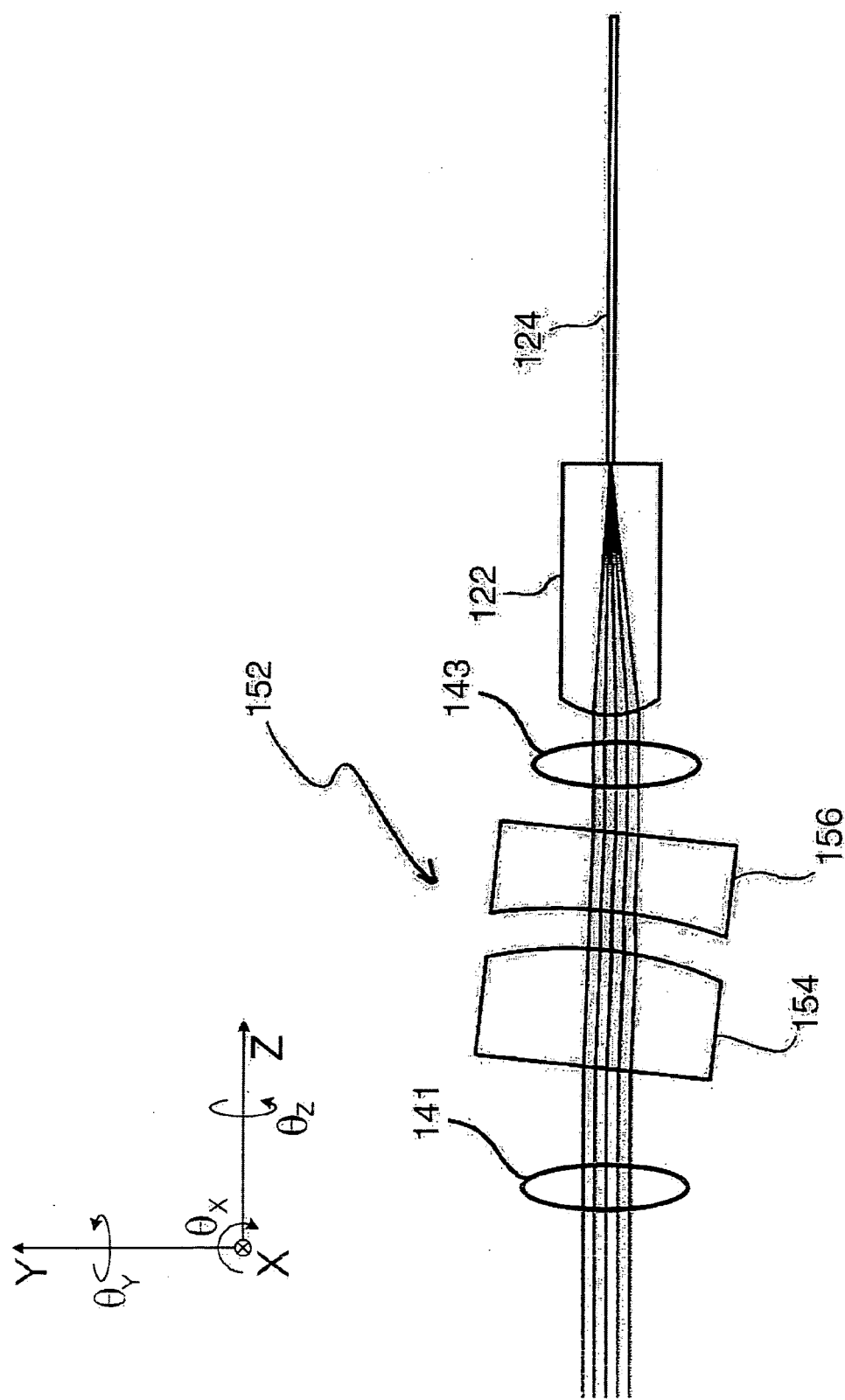
FIG. 21 is an optical schematic representation of an alignment compensation module that uses a rotated, afocal lens pair to remove an alignment error.

In another aspect, alignment compensation module 152 includes afocal lens pair 154 and 156 that may be rotated together to compensate for residual alignment errors as shown in FIG. 21. This rotation, or tilt, has the effect of displacing lenses 154 and 156 in opposite directions in the X-Y plane. As shown in FIG. 21, afocal lens pair 154 and 156 has been rotated in the $\theta_X$ direction to remove an alignment error in the Y direction at the core of fiber 124. Similarly, a rotation of afocal lens pair 154 and 156 in the $\theta_Y$ direction will remove residual alignment errors in the X direction at the core of fiber 124. Rotating lens pair 154 and 156 in the $\theta_X$ direction and the $\theta_Y$ direction changes the angular propagation direction of light beam 143 and allows residual alignment errors to be removed.

Figure 22A:
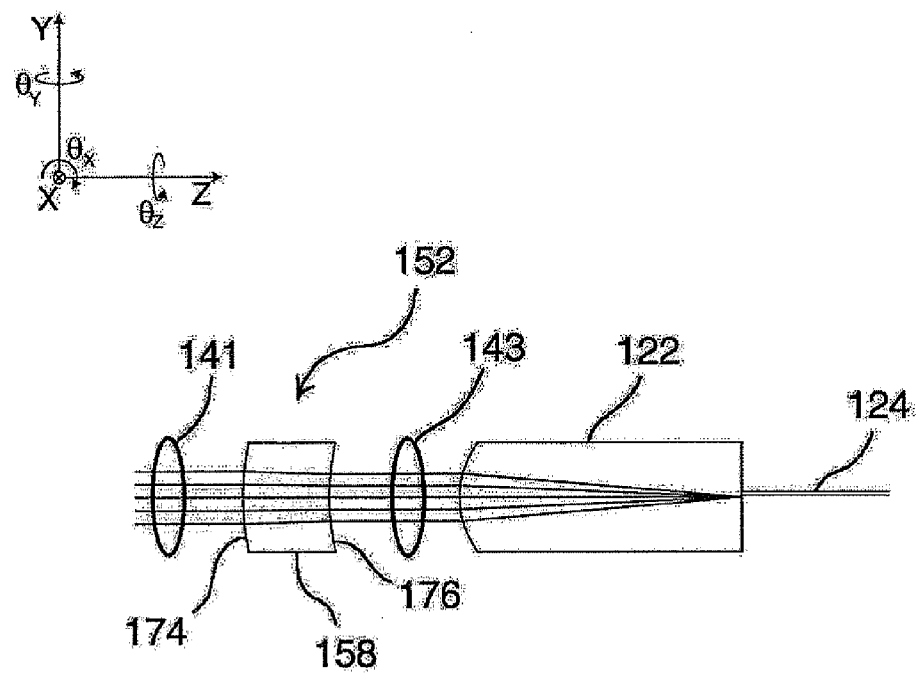
FIG. 22A is an optical schematic representation showing a residual alignment error and an alignment compensation module with an afocal lens.
Figure 22B:
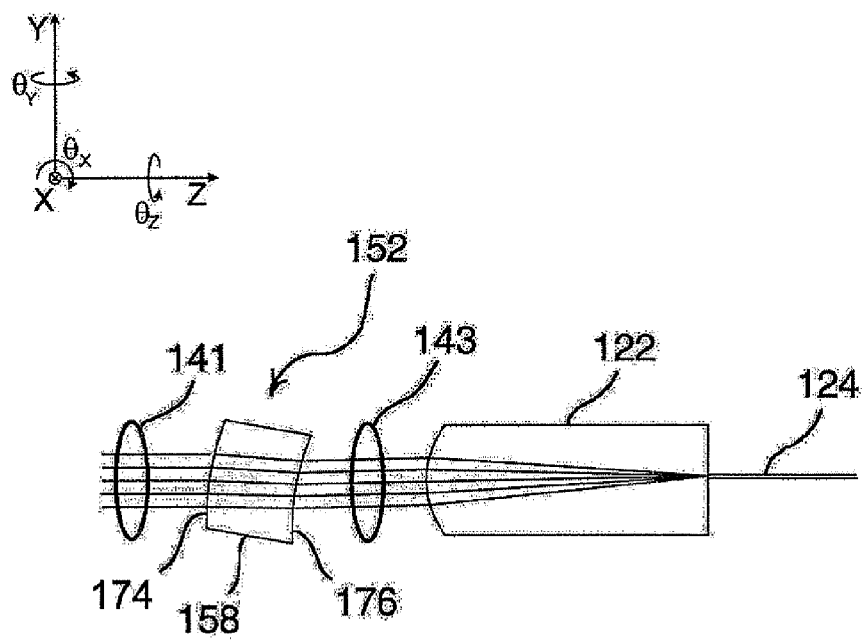
FIG. 22B is an optical schematic representation showing the removal of an alignment error by rotating the lens shown in FIG. 22A.

In one example embodiment, alignment compensation module 152 includes a single lens 158 that may be rotated in the $\theta_X$ direction and $\theta_Y$ direction to compensate for residual alignment errors as shown in FIGS. 22A and 22B. An optical schematic of an alignment compensation module 152 is shown in FIG. 22A. Substantially collimated light beam 141, shown propagating along a Z axis, passes through alignment compensation module 152 where it is refracted by lens 158 to produce substantially collimated light beam 143. Light beam 143 is then focused by lens 122. A residual alignment error is also illustrated in FIG. 22A, albeit greatly exaggerated. That is, there is a residual alignment error between the position of the light focused by lens 122 and the core of fiber 124. Lens 158 is afocal and does not appreciably change the state of collimation of light beam 141. As shown in FIG. 22B, lens 158 has been rotated in the $\theta_X$ direction to remove an alignment error of the focused light in the Y direction at the core of fiber 124. Similarly, a rotation of lens 158 in the $\theta_Y$ direction will remove residual alignment errors in the X direction at the core of fiber 124. Rotating lens 158 in the $\theta_X$ direction and $\theta_Y$ direction changes the angular propagation direction of light beam 143 in the $\theta_X$ direction and the $\theta_Y$ direction, respectively. Residual alignment errors may be removed by appropriately rotating lens 158 in the $\theta_X$ direction and the $\theta_Y$ direction.

Lens 158 has curved surfaces 174 and 176. Surfaces 174 and 176 may have either spherical or aspherical curvatures. Curvatures 174 and 176 are selected so that relatively large rotations of lens 158 produce small angular deviations in the propagation direction of light beam 143. Lens 158, designed to be afocal, does not substantially change the degree of collimation of incoming light beam 141. Rotations of alignment compensation module 152 in the $\theta_X$ direction and the $\theta_Y$ direction are used to change the angular propagation direction of light beam 143 and slightly displace the focused position of the light to compensate the optical beam alignment with respect to the core of optical fiber 124.

Alignment compensation module 152 may use an afocal optical system that is rotated in the $\theta_X$ direction and $\theta_Y$ direction when used in a substantially collimated light beam. In this aspect, the optical elements of alignment compensation module 152 are not limited to one or two refractive elements, but may also be a combination of one or more reflective, refractive, and diffractive elements to form an afocal system that deviates the angular propagation direction of substantially collimated light beam when this combination is rotated in the $\theta_X$ direction and $\theta_Y$ direction. This is in contrast to a plane parallel plate, that when rotated in the $\theta_X$ direction and $\theta_Y$ direction, laterally shifts the location of an optical beam, but does not change its angular propagation direction. Alignment compensation module 152 can be designed such that shifts of mounts 166 that inevitably occur after alignment and securing affect final alignment much less than shifts of the optical components themselves such as mirrors 126 and collimators 125. For example, applicants have found it advantageous that the optical elements in alignment compensation module 152 need to be rotated about five to ten times further in angular measure to remove residual alignment errors than if collimator 125 were rotated directly to remove a residual alignment error. This reduces the sensitivity of the final alignment, making it easier to align, and reduces affects due to any mount shifts within alignment compensation module 152.

Figure 23:
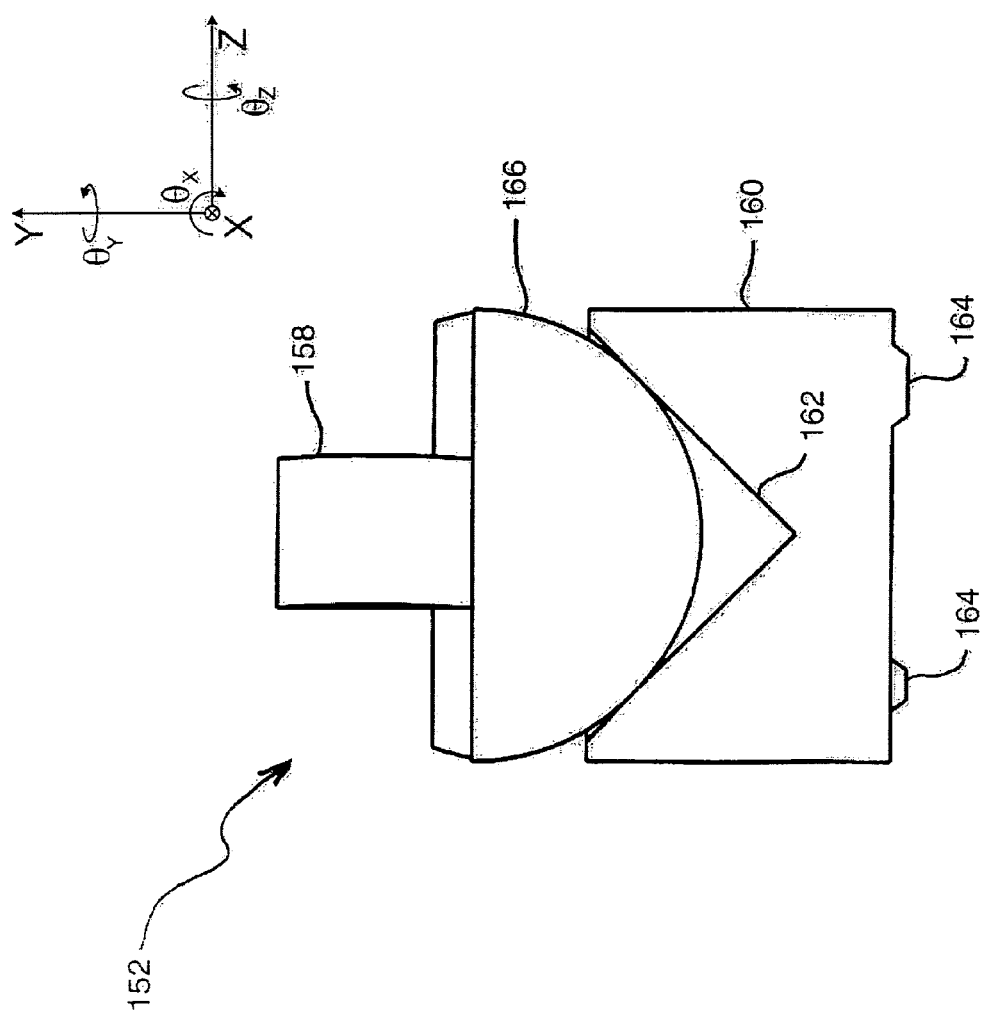
FIG. 23 is a side sectional view of an alignment compensation module with a single lens in an adjustable, rotating mount.
Figure 24:
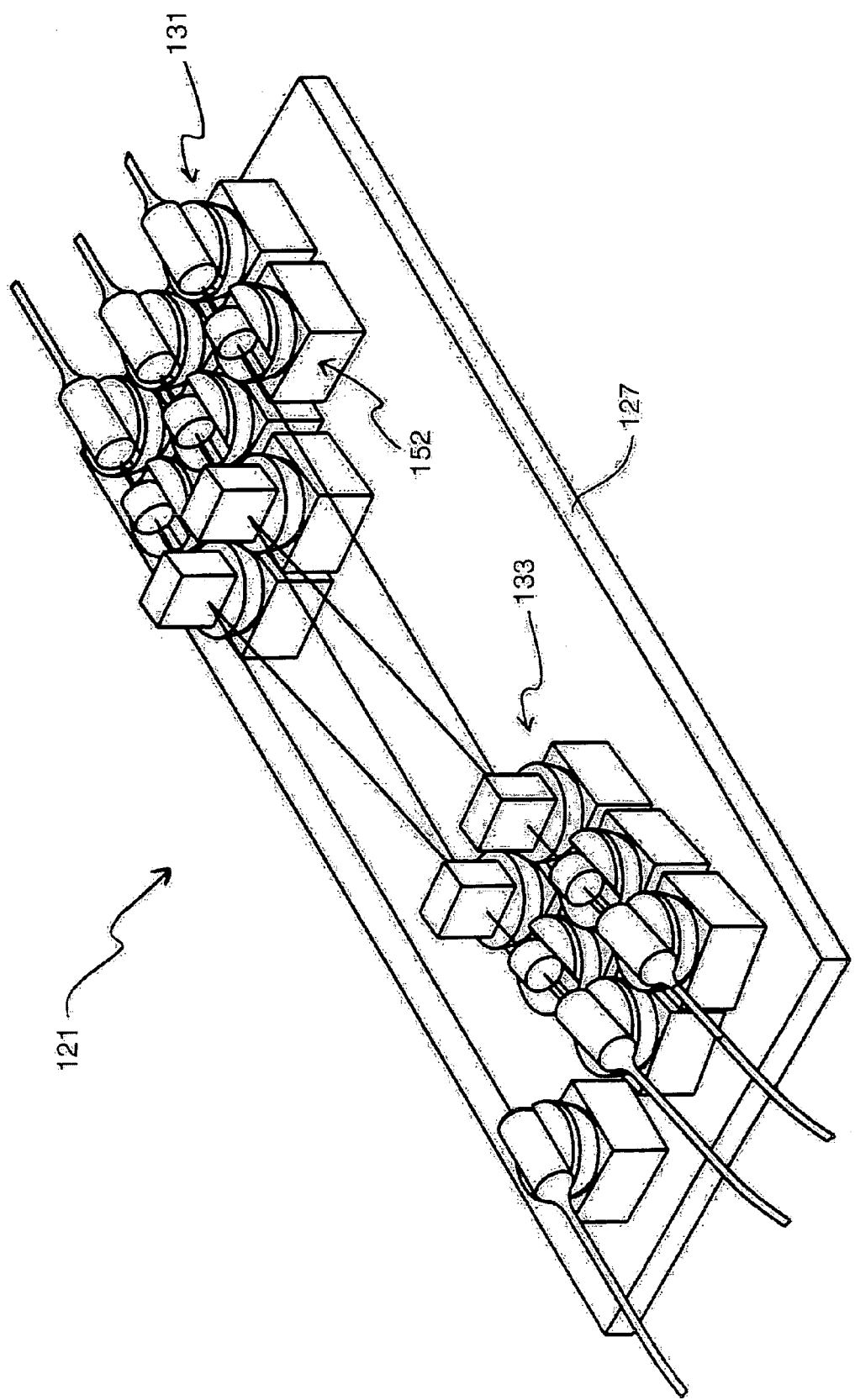
FIG. 24 is a perspective view of a fiber optic demultiplexer device with alignment compensation modules.

FIG. 24 is a perspective view of demultiplexer 21 from FIG. 16 showing alignment compensation modules 152. A side sectional view of alignment compensation module 152 is shown in FIG. 23. Lens 158 is attached to spherically shaped lens mount 166. Receptacle 162 in alignment compensation mount 160 receives lens mount 166. Lens mount 166 swivels in receptacle 162 in the $\theta_X$ direction and $\theta_Y$ direction in order to compensate for residual alignment errors as discussed with reference to FIGS. 22A and 22B. Registration features 164 are provided on alignment compensation mount 160. Registration features 164 mate with corresponding features (not shown) on fixed reference 127 of FIG. 24 to position alignment compensation modules 152 into fixed reference 127. Alignment compensation mount 160 may be secured to fixed reference 127 appropriate means such as adhesive, solder, welding, or other appropriate attachment technique. Upon removing residual alignment error by tilting or rotating lens 158 in the $\theta_X$ direction and $\theta_Y$ direction, mount 166 may be secured to alignment compensation mount 160 by appropriate means such as adhesive, solder, welding, or other appropriate attachment technique. Lens 158 may be secured to mount 166 appropriate means such as adhesive, solder, welding, or other appropriate attachment technique. Mounts 166 may be transparent to allow appropriate radiation to secure mount 166 to receptacles 162 such as with adhesive or by laser soldering. Relative references 160 may also be transparent to facilitate adhesive curing or laser soldering. Mount 166 and relative reference 160 may be of appropriate materials, or a combination of materials, such as metal, glass, ceramic, semiconductor, or plastic and have coatings to facilitate bonding of mount 166 to relative reference 160. Mount 160 may also contain additional mechanical features to aid in gripping, manipulating and aligning. Receptacle 162 may have other shapes such as a spherical socket, hole, hole with a chamfer, or simply a planar surface, that allow mount 166 to swivel on the receptacle in the $\theta_X$ direction and the $\theta_Y$ direction. Lens 158 may also be secured to a mount that contains a receptacle and the relative reference may contain a spherical feature to permit angular adjustment of lens 158. Fixed reference 127 may also contain a receptacle and mount 166 may be placed directly into this receptacle without further need of relative reference 160. The various mounts, relative references, and fixed references may also be made by molding. Alignment compensation module 152 is shown in FIGS. 16 and 24 to be between optical filters 126 and lenses 122. The present invention is not limited to this configuration. For example, alignment compensation module 152 could also be placed between mirrors 126A and 126B, to compensate for residual alignment errors at fiber 124C. Also, with proper design, alignment compensation module 152 may be inserted into diverging or converging beams to change the beam position and compensate for residual alignment errors. It is also not necessary to populate fixed reference 127 with all alignment compensation modules 152 if the alignment at a particular fiber 124 is within specification without alignment compensation module 152.

Typically, many prealigned optical modules may be manufactured and stored for later insertion into fixed references to rapidly build complex optical devices such as demultiplexer 121. In one aspect the alignment compensation module is used to perform a final alignment of one or more prealigned optical components. In such an embodiment, the tolerance requirements for a prealigned optical module can be relaxed because the final compensation performed by the alignment compensation module is used to remove any residual alignment errors. This reduces the cost of manufacturing the prealigned optical module.

Figure 25:
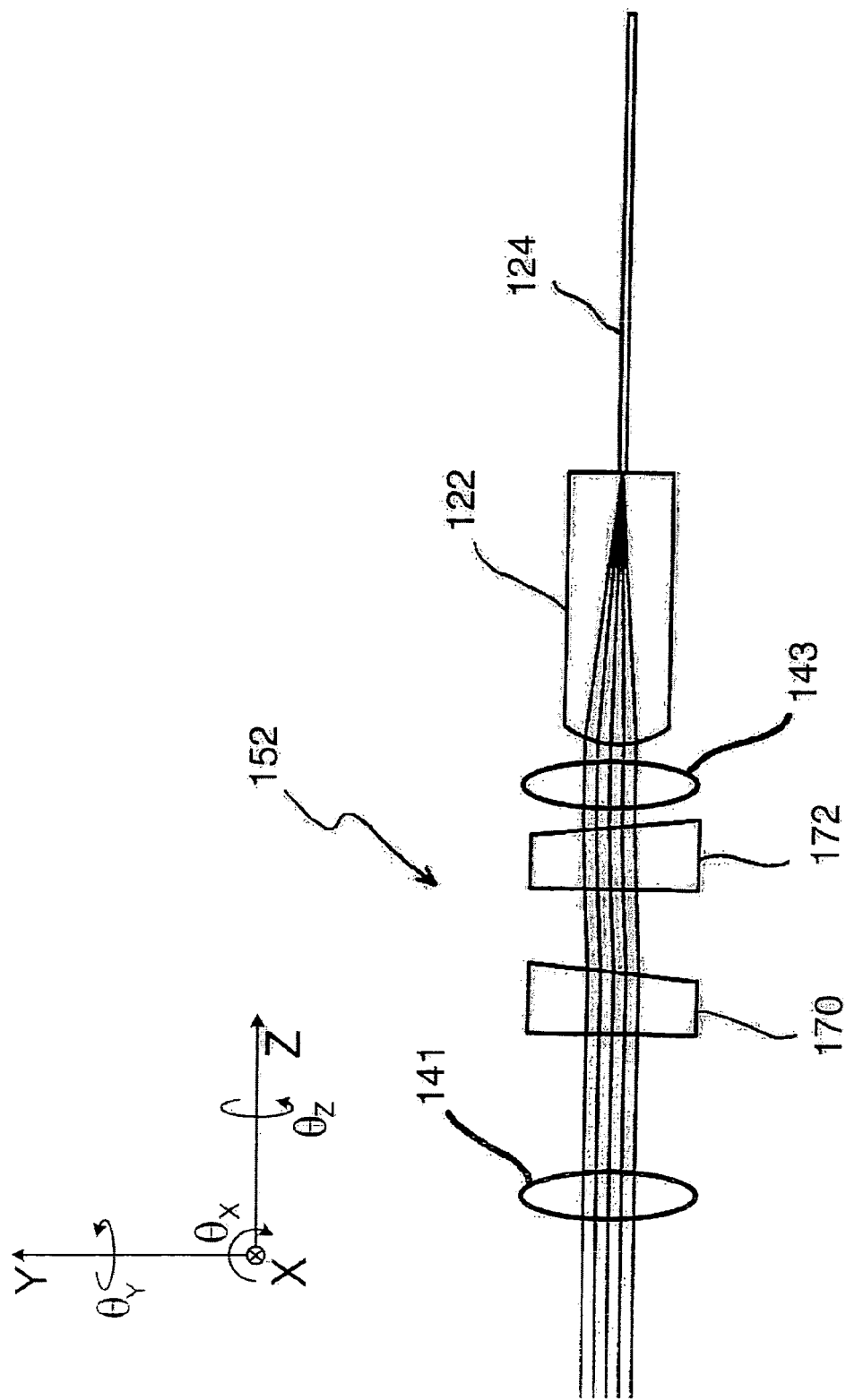
FIG. 25 is an optical schematic representation of an alignment compensation module with Risley wedge prisms.

FIG. 25 is an optical schematic representation of another aspect of alignment compensation module 152. Substantially collimated light beam 141 passes through alignment compensation module 152 where it is refracted by two optical wedges 170 and 172, commonly referred to as Risley prisms. Wedges 170 and 172 may be rotated independently in the $\theta_Z$ direction to change the angular propagation direction of light beam 143 and remove residual alignment errors.

Figure 26:
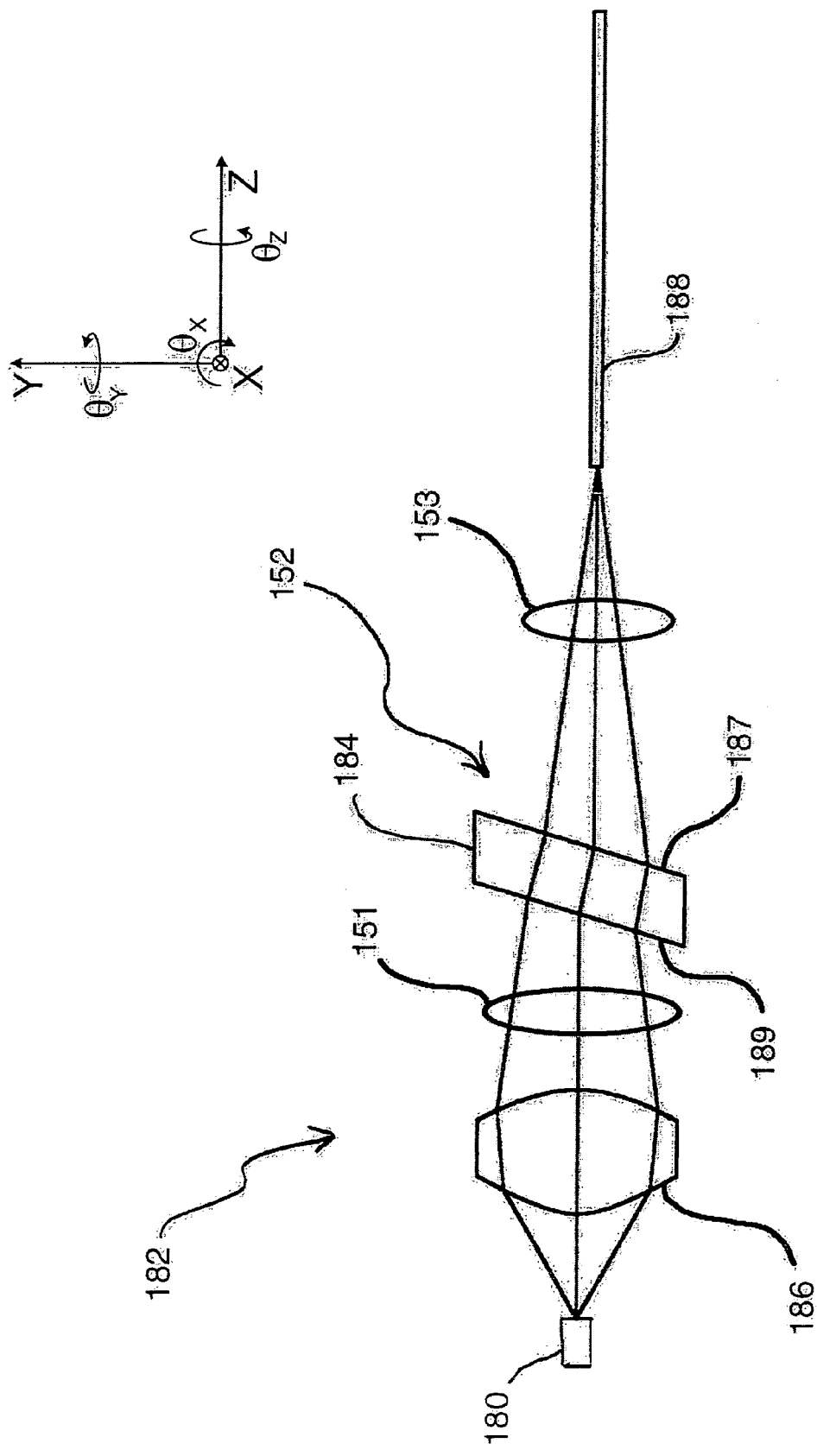
FIG. 26 is an optical schematic representation of a laser transmitter with a single, tilted, optical window for removing alignment errors.

FIG. 26 shows another aspect of alignment compensation module 152 for removing residual alignment errors in laser transmitter 182. FIG. 26 is an optical schematic representation of laser transmitter 182. Diverging light from laser source 180 is collected by lens 186 where it is converted to converging light beam 151. Optical window 184 has two planar surfaces 187 and 189. Optical window 184 may be made of be made of optical glass, plastic, or other materials that are transparent at the wavelengths of interest. The optical window may be made of silicon, for example, at telecommunication wavelengths between 1.3 and 1.6 µm since silicon is transparent at these wavelengths. Optical window 184 may be rotated in the $\theta_X$ direction and the $\theta_Y$ direction to displace the light beam 153 in the Y direction and X direction, respectively, to remove residual alignment errors with respect to the core of optical fiber 188. Optical window 184 may also be rotated in the $\theta_Z$ direction with another rotation in either the $\theta_X$ direction or the $\theta_Y$ direction to remove residual alignment errors.

Figure 27:
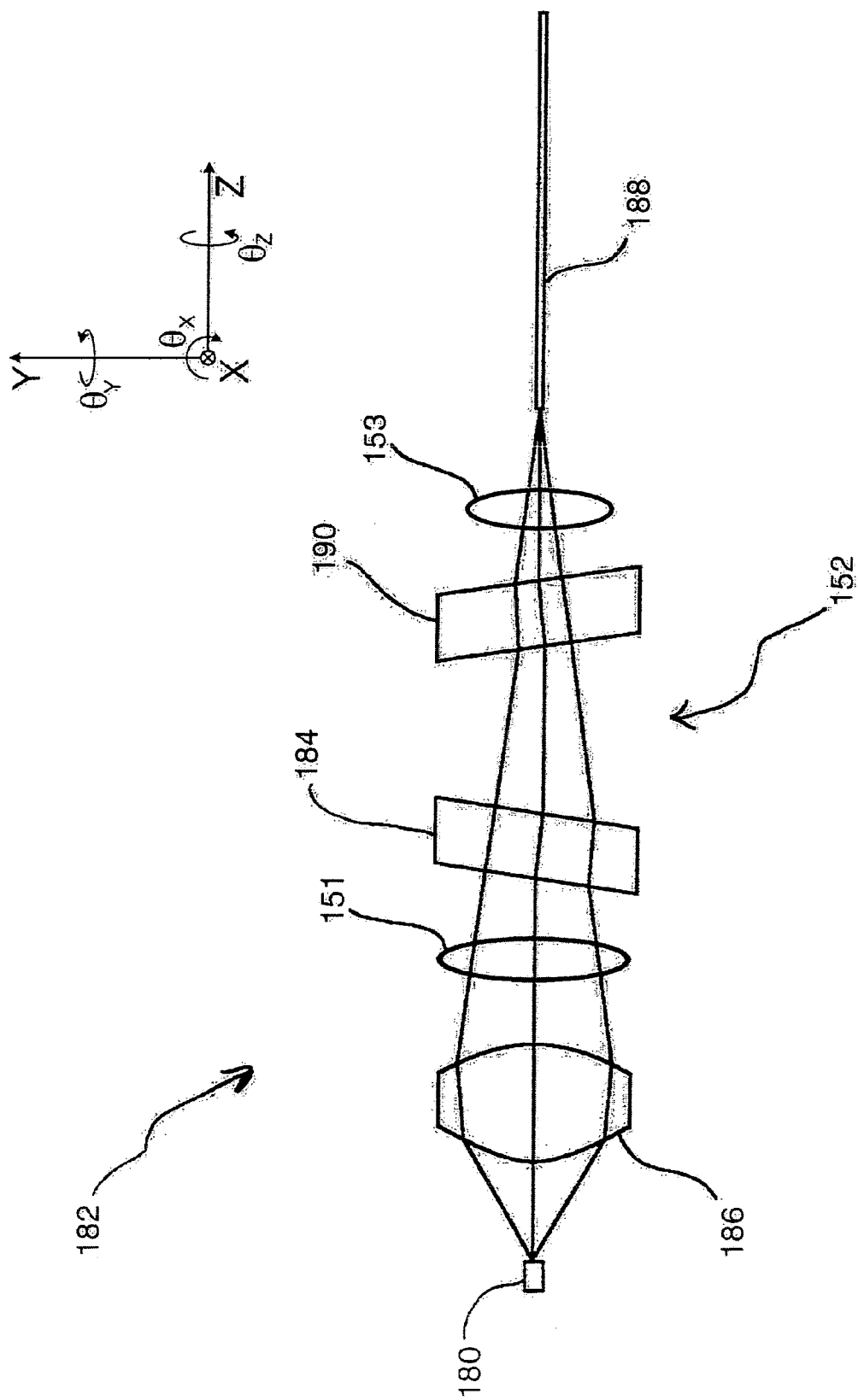
FIG. 27 is an optical representation of a laser transmitter with two tilted, optical windows for removing alignment errors.

Another aspect of alignment compensation module 152 for removing residual alignment errors is shown in FIG. 27. FIG. 27 is an optical schematic representation of laser transmitter 182. Alignment compensation module consists of optical windows 184 and 190. Optical windows 184 and 190 may be independently rotated in the $\theta_Z$ direction to shift the position of light beam 153 in the X direction and Y direction to compensate for residual alignment errors with respect to the core of optical fiber 188. Optical windows 184 and 190 may be rotated in v-grooves that are integral to their respective mounts and secured with solder, adhesive, or welded in place.

Although the present invention has been described with reference to preferred embodiments, workers skilled in the art will recognize that changes may be made in form and detail without departing from the spirit and scope of the invention. For example, the number of solder, heater, and receiver sets may be altered depending on detailed requirement. The sequence of reflowing the solder may be altered to enhance stability. For example, entire multimodule assemblies can be arranged on an optical "circuit board" to fabricate a complex opto-electronic assembly. The optical component can be any type of active or passive optical, opto-electrical or opto-mechanical component and not limited to the specific examples set forth herein. The optical component can be aligned and its orientation fixed using any suitable or desirable means. The specific components and examples set forth herein are provided to demonstrate various aspects of the invention and do not limit the scope of the invention. Other elements, shapes, components, configurations, etc. are within the scope of the invention. Any appropriate registration technique that provides the desired amount of constraint may be used. Preferably, the registration technique is highly repeatable and accurate in all six degrees of freedom. Any appropriate material can be used for the various components. In one specific aspect, the relative reference mount and other components are formed from a single crystal material such as silicon. In another aspect, these components can be fabricated from any electrical material including semiconductors or ceramics. Other materials include machinable materials such as steel, aluminum, metal alloys, etc. depending on requirements of a particular implementation. An assembled optical module can be used to fabricate an optical device using a "pick and place" machine or any suitable or desirable means. In such an embodiment, the chamfers or bevels on the edges of the component mount can facilitate mechanical gripping of the mount. Similarly, the various components of the invention can be fabricated using any desired technique. Solders are known in the art and any appropriate solder can be selected to obtain the desired characteristics. The optical component can be coupled directly to the relative reference mount without a separate component mount. As used herein, "light" is not necessarily visible light. Further, the optical component can be any active or passive optical, opto-electrical or opto-mechanical element.

The alignment compensation modules of the present invention is not limited to compensating the final alignment of an optical beam with respect to optical fibers and may be used for compensating, for example, the final optical beam alignment with respect to the active area of a photodetector or may be used to angularly align the collimated beam of light exiting a laser collimator. In one aspect, alignment compensation modules can be comprised of a single lens or optical element or multiple lenses or optical elements. When multiple lenses or elements are used, the lenses and elements can rotate together and may be held in a single mount, or moved separately. Not all of the lenses and elements must rotate and may be stationary or exhibit some other form of movement such as a translation or rotation. The optical modules can be prealigned using any appropriate technique for example, the techniques set forth in U.S. patent application Ser. No. 09/789,317, filed Feb. 20, 2001 and entitled "OPTICAL ALIGNMENT SYSTEM".

What is claimed is:

1. An alignment compensation module to align a light beam with an initial angular propagation direction along a z-axis comprising:
   a single lens element having two curved surfaces configured to deviate the angular propagation direction of the light beam when rotated about a y-axis which is perpendicular to the z-axis, wherein the amount of deviation is less than an amount of rotation of the single lens element; and
   a mount configured to rotate the lens element about the y-axis which is perpendicular to the z-axis.

2. The apparatus of claim 1 wherein the mount fixedly secures the single lens element with an attachment material.

3. The apparatus of claim 1 wherein the mount includes registration features configured to mate with registration features on a fixed reference.

4. The apparatus of claim 1 wherein the mount is transparent to radiation used to fix a position of the single lens element.

5. The apparatus of claim 1 wherein:
   the light beam is collimated; and
   the single lens element does not substantially alter the collimation of the light beam.

6. The apparatus of claim 5 wherein the single lens element is rotated at least 5 times further in angular measure than the angular deviation of the light beam.

7. The apparatus of claim 1 wherein:
   the lens element is additionally configured to rotate about an x-axis; and
   the mount is configured to rotate the lens element about the x-axis which is perpendicular to both the y-axis and the z-axis.

8. The apparatus of claim 7 wherein the mount includes a spherical surface that is received in a receptacle.

* * * * *